US011055309B2

(12) United States Patent
Murthy

(10) Patent No.: US 11,055,309 B2
(45) Date of Patent: Jul. 6, 2021

(54) SYSTEMS AND METHODS FOR GENERATING, DEPLOYING, AND MANAGING DATA INFRASTRUCTURE STACKS

(71) Applicant: datacoral, Inc., San Francisco, CA (US)

(72) Inventor: Raghotham Murthy, San Francisco, CA (US)

(73) Assignee: Datacoral, Inc., San Francisco, CA (US)

( * ) Notice: Subject to any disclaimer, the term of this patent is extended or adjusted under 35 U.S.C. 154(b) by 0 days.

(21) Appl. No.: 16/830,246

(22) Filed: Mar. 25, 2020

(65) Prior Publication Data

US 2020/0311096 A1      Oct. 1, 2020

Related U.S. Application Data

(60) Provisional application No. 62/823,587, filed on Mar. 25, 2019.

(51) Int. Cl.
*G06F 16/25*         (2019.01)
*G06F 9/54*          (2006.01)
*G06F 16/2452*       (2019.01)

(52) U.S. Cl.
CPC ............ *G06F 16/254* (2019.01); *G06F 9/54* (2013.01); *G06F 16/2452* (2019.01)

(58) Field of Classification Search
CPC ...... G06F 9/54; G06F 16/254; G06F 16/2452; G06F 11/366
See application file for complete search history.

(56) References Cited

U.S. PATENT DOCUMENTS

| 6,272,488 B1 | 8/2001 | Chang |
| 2002/0174122 A1 | 11/2002 | Chou |
| 2013/0055023 A1* | 2/2013 | Chong ............. G06F 11/366 714/30 |
| 2019/0121897 A1 | 4/2019 | Edalur |

OTHER PUBLICATIONS

International Application No. PCT/US2020/024783, International Search Report and Written Opinion dated Aug. 27, 2020.
Reda, Naglaa M. et al., "Open-Gate: An Efficient Middleware System for Heterogeneous Distributed Databases," International Journal of Computer Applications (0975-8887), vol. 45, No. 2, pp. 44-49, May 22, 2012.

* cited by examiner

*Primary Examiner* — Etienne P Leroux
(74) *Attorney, Agent, or Firm* — Ahmann Kloke LLP

(57) ABSTRACT

A method comprising receiving, from a first enterprise system, a series of first language commands written in a first language to control a first data flow of first data, the first data being from a first and a second data source, the first series of first language commands indicating first functions to be performed including collection of first data, storage of the first data into a first data warehouse, and application of one or more first applications on the stored first data, the first and second data sources being unrelated to each other and being remote from the first enterprise system and the data warehouse, translating the series of first language commands into first translated commands that may be provided to the first and second data sources as well as the first data warehouse to control the first data flow.

18 Claims, 25 Drawing Sheets

| Data Sources and Targets | Timing Declaration in SQL | Batches of Timelabels |
|---|---|---|
| Events from mobile apps (iOS) | datacoral collect describe --slice-type mobile --schema events<br>/\*\*<br>* @matview-name events.mobile<br>* @matview-update-mode append<br>* @interval-in-minutes 5<br>* @output-warehouse myredshift<br>\*/ | 2019-08-15 7:00... ...2019-08-15 7:55<br>\|00\|05\|10\|15\|20\|25\|30\|35\|40\|45\|50\|55\|<br>*a dozen 5-minute batches* |
| Query from PostgreSQL | datacoral collect describe --slice-type postgresql --schema pg<br>/\*\*<br>* @matview-name pg.objects<br>* @matview-update-mode append<br>* @interval-in-minutes 15<br>* @output-warehouse myredshift<br>\*/ | 2019-08-15 7:00... ...2019-08-15 7:45<br>\| 7:00 \| 7:15 \| 7:30 \| 7:45 \|<br>*four 15-minute batches* |
| Query from Salesforce | datacoral collect describe --slice-type postgresql --schema sfdc<br>/\*\*<br>* @matview-name sfdc.objects<br>* @interval-in-minutes 30<br>* @output-warehouse myredshift<br>\*/ | \| 2019-08-15 7:00 \| 2019-08-15 7:30 \|<br>*two 30-minute batches* |
| Analytic Data Views (amazon REDSHIFT) | /\*\*<br>* @matview-schema myredshift<br>* @matview-name analytics.engagement<br>* @interval-in-minutes 60<br>* @output-warehouse myredshift<br>\*/<br>SELECT ...<br>FROM events.mobile<br>JOIN pg.objects<br>JOIN sfdc.objects | \| 2019-08-15 7:00 \|<br>*a 60-minute batch* |
| Publish to Salesforce | /\*\*<br>* @matview-schema myredshift<br>* @matview-name analytics.engagement<br>* @interval-in-minutes 60<br>* @output-target sfdc-connection-params<br>\*/<br>SELECT \*<br>FROM analytics.engagement | \| 2019-08-15 7:00 \|<br>*a 60-minute batch* |

SYSTEMS AND METHODS FOR GENERATING, DEPLOYING, AND MANAGING DATA INFRASTRUCTURE STACKS

CROSS-REFERENCE TO RELATED APPLICATIONS

The present application claims benefit of U.S. Provisional Patent Application No. 62/823,587 filed Mar. 25, 2019 and entitled "Systems and Methods for End-to-End Data Flow Control" which is incorporated by reference herein.

TECHNICAL FIELD

This disclosure pertains to systems for generating, deploying, and managing data infrastructure stacks.

BACKGROUND

The digitalization of many aspects of business has created a variety of software and data storage applications to collect, organize, analyze, and output data associated with each aspect of the business. The software which collects data from data sources may deposit the data, as is, into a data lake or data warehouse.

Data may be required to be organized and formatted in different ways before applying tools and/or publishing the results. In an example, data collected from a Structured Query Language (SQL) database may be organized and stored in a data warehouse as a row-orientated database while Redshift may require input data to be formatted as a column-orientated database. Before the data is published by software such as Salesforce, the data outputted by Redshift may require formatting. For example, Salesforce may need input data to be in a comma-separated values (CVS) format, while the output data from Redshift is in the column-orientated database.

Each of the software applications, such as the above-referenced software applications, require that data inputted to and outputted from the software applications must be in a particular file format or data format. In the prior art, custom code is often required to convert data from one format to another. This creates a problem for data scientists to identify the software tools required to organize, transform, and move data between different software applications and publish the results in applications or databases.

Large enterprises that wish to utilize artificial intelligence, data analytics, and/or data science must often hire a considerable number of data engineers to handle the coding from ingesting, organization, application, and publication of the data. The number of data engineers to handle and understand the data flow just to enable a data scientist to understand the data may be considerable.

Under conventional approaches, once the required software tools have been identified, a great deal of time is spent coding to ensure that the data flows downstream from an originating software tool which may collect data from multiple data sources to a publication software tool which serves up data into an application, database, or machine learning algorithm. Upstream from the publication, software tools may be an organizing software tool that transforms or aggregates the data from the data lake and to an analysis software tool that analyzes or searches the organized data. The passage from the originating software tool to the publication tool may not be created by a subject matter specialist and may be generated by a data scientist who may not understand the meaning behind the data.

SUMMARY

An example system comprises a memory storing computer executable components and a processor configured to execute instructions stored in the memory to perform a method. The method may comprise receiving, from a first enterprise system, a series of first language commands written in a first language to control a first data flow of first data, the first data being from a first and a second data source, the first series of first language commands indicating first functions to be performed including collection of first data, storage of the first data into a first data warehouse, and application of one or more first applications on the stored first data, the first and second data sources being unrelated to each other and being remote from the first enterprise system and the data warehouse, translating the series of first language commands into first translated commands that may be provided to the first and second data sources as well as the first data warehouse to control the first data flow, the first translated commands being based on the series of first language commands in the first language, a structure of the first translated commands being retrieved from a translator data structure based on the first translated commands, the first and second data sources requiring different translated commands and the first data warehouse requiring different translated commands form the first and second data sources, providing a first set of the first translated commands to the first data source to collect first data from the first data source, providing a second set of the first translated commands to the second data source to collected first data from the second data source, providing a third set of the first translated commands to transform the first data in the data warehouse, receiving, from a second enterprise system, a second of first language commands written in a first language to control a second data flow of second data, the second data being from the second data source and a third data source, the second series of second language commands indicating second functions to be performed including collection of second data, storage of the second data into a second data warehouse, and application of one or more second applications on the stored second data, translating the series of second language commands into second translated commands that may be provided to the second and third data sources as well as the second data warehouse to control the second data flow, the second translated commands being based on the series of second language commands in the first language, a structure of the second translated commands being retrieved from the translator data structure based on the first translated commands, the second and third data sources requiring different translated commands and the second data warehouse requiring different translated commands form the second and third data sources, providing a first set of the second translated commands to the first data source to collect second data from the second data source, providing a second set of the second translated commands to the third data source to collected second data from the third data source, and providing a third set of the second translated commands to transform the first data in the data warehouse.

In various embodiments, the first language is SQL. The method may further comprise receiving an API update from the second data source and generating the structure of the first translated commands and the structure of the second translated commands including the new API. In various embodiments, the method may further comprise determining dependencies based on the first series of language commands, synchronize queries for the first and second set of first translated commands, and orchestrate data flow from the first and second data sources and functions of the first data warehouse.

The first series of language commands may further comprise instructions to publish the first data from the first data warehouse to a first application. Further, the method may further comprise providing a fourth set of first translated commands to the first data warehouse to publish the first data to the first application.

In some embodiments, the first data from the first data source is placed in regular tables in the first data warehouse based on the first translated commands, the regular tables supporting replace, merge, and append semantics. Further, in some embodiments, at least some of the first data from the second data source is placed in partitioned tables, the partitioned tables supporting append semantics and support periodic pruning of rows based on retention rules.

The method may further comprise generating a time label for a data batch of the first data from the first data source, the time label being based on a system clock marking when the data batch was collected.

An example method may comprise receiving, from a first enterprise system, a series of first language commands written in a first language to control a first data flow of first data, the first data being from a first and a second data source, the first series of first language commands indicating first functions to be performed including collection of first data, storage of the first data into a first data warehouse, and application of one or more first applications on the stored first data, the first and second data sources being unrelated to each other and being remote from the first enterprise system and the data warehouse, translating the series of first language commands into first translated commands that may be provided to the first and second data sources as well as the first data warehouse to control the first data flow, the first translated commands being based on the series of first language commands in the first language, a structure of the first translated commands being retrieved from a translator data structure based on the first translated commands, the first and second data sources requiring different translated commands and the first data warehouse requiring different translated commands form the first and second data sources, providing a first set of the first translated commands to the first data source to collect first data from the first data source, providing a second set of the first translated commands to the second data source to collected first data from the second data source, providing a third set of the first translated commands to transform the first data in the data warehouse, receiving, from a second enterprise system, a second of first language commands written in a first language to control a second data flow of second data, the second data being from the second data source and a third data source, the second series of second language commands indicating second functions to be performed including collection of second data, storage of the second data into a second data warehouse, and application of one or more second applications on the stored second data, translating the series of second language commands into second translated commands that may be provided to the second and third data sources as well as the second data warehouse to control the second data flow, the second translated commands being based on the series of second language commands in the first language, a structure of the second translated commands being retrieved from the translator data structure based on the first translated commands, the second and third data sources requiring different translated commands and the second data warehouse requiring different translated commands form the second and third data sources, providing a first set of the second translated commands to the first data source to collect second data from the second data source, providing a second set of the second translated commands to the third data source to collected second data from the third data source, and providing a third set of the second translated commands to transform the first data in the data warehouse.

BRIEF DESCRIPTION OF THE DRAWINGS

FIG. 8 is a depiction of how data arrives, timing declaration in a SQL from the unified interface, and batches of timelables generated by the translators and the synchronization module.

Figure 21:
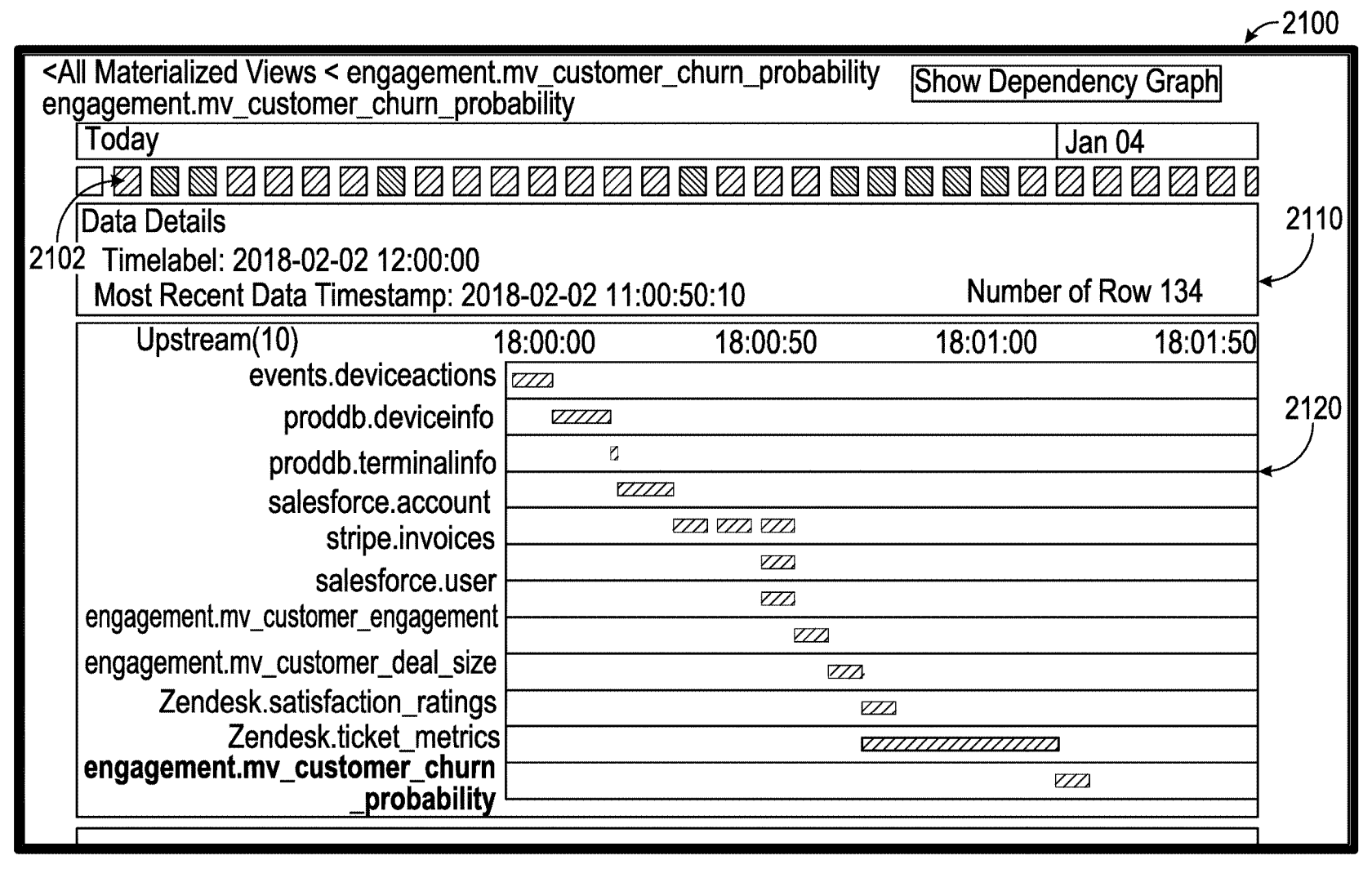

FIG. 21 depicts an example output interface which displays the dependency graph of a particular table according to some embodiments.

DETAILED DESCRIPTION

Under conventional approaches, users may not utilize new and existing cloud services and functions on data having different schemas and/or different storage sources without creating and customizing a new proprietary infrastructure. A proprietary infrastructure may include considerable data engineering for custom coding. Custom coding is typically utilized to retrieve data (e.g., ingest) from different sources at different times to a data warehouse or data late. Custom coding is used to transform (e.g., organize and change) the data as needed for different analytical and computational tools. Custom coding is also required to harness and control different analytical tools as well as publish data. As such, a considerable number of data engineers may be required.

As a result, creating, utilizing and maintaining a proprietary infrastructure typically takes months or years. Custom coding and proprietary infrastructures do not scale and may not be efficiently updated and/or re-used.

For example, Amazon Redshift is a powerful yet affordable data warehouse, and while getting data out of Redshift is easy, getting data into and around Redshift can pose problems as the warehouse grows. Data ingestion issues start to emerge when organizations outgrow the COPY command that imports CSV files from Amazon Simple Storage Service (Amazon S3) buckets. And, of course, these issues take shape at the worst possible time-when the warehouse becomes popular with analysts and data scientists as they increase demand for more data, sources, and targets.

When this happens, data engineers jump forward with myriad solutions that can be built. Complex data pipelines are constructed from a combination of Amazon Web Services (AWS) and open source tools, and for a few weeks it all works fine.

Then, in order to satisfy increasing requests for changes, new sources, and fixes to what's been built, the enterprise data engineer may start asking for more resources than the enterprise data science team has to offer.

This is when the enterprise realizes that they are the proud owner of a brittle, complicated data infrastructure that no one can maintain—not even its architect.

Figure 1:
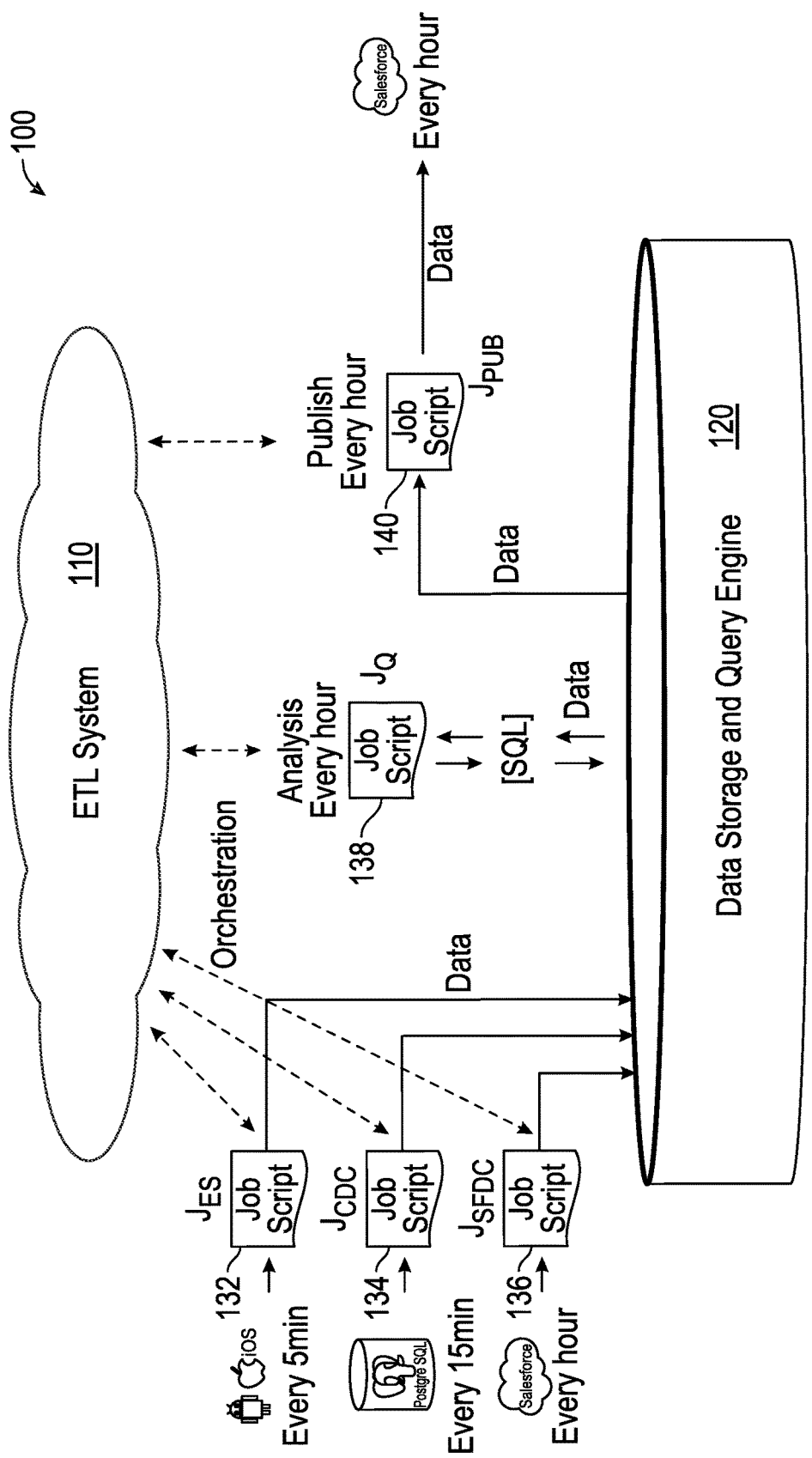
FIG. 1 depicts an example system to orchestrate data collection, analyze data in data storage, and publish the analyzed data according to existing solutions.

FIG. 1 depicts an example system 100 to orchestrate data collection, analyze data in data storage, and publish the analyzed data according to existing solutions. The system 100 includes an extract transform load (ETL) system 110, a data storage and query engine 120, and job scripts 132, 134, 136, 138, and 140. The ETL system 110 is typically an enterprise system (i.e., controlled by a separate enterprise or entity). Custom job scripts (e.g., job scripts 132, 134, 136, 138, and 140) may each be created by the ETL system 110 for a particular enterprise. It will be appreciated that each different entity (e.g., each different enterprise) will have created their own ETL systems 110 and their own custom job scripts for collection, transformation, application harnessing, and publication of data from similar and/or different data sources, data tables, data, data tools, and publications. Each enterprise will create its own custom coding to tie the data together across their own proprietary pipelines.

The ETL system 110 includes custom coding to perform different acts including to extract, transform, and load data from a data store of the data storage and query engine 120. Each of these functions required by the ETL system 110 may be achieved by using a custom job script. A custom job script is a shell script which contains setup information for a job which may be executed by an operating system. Each of the multiple custom job scripts needs to be individually programmed and may be customized for a particular function performed on a particular data source or type of data source at a particular frequency.

In some embodiments, the ETL system 110 extracts or reads data from any number of data sources and store the data to the data storage and query engine 120. For example, the ETL system 110 may utilize the custom job script 132 to collect data regarding mobile application usage from the data source every five minutes. The ETL system 110 may utilize the custom job script 134 to collect data from another data source such as PostgreSQL or some other an open-source database management system, every fifteen minutes. The ETL system 110 may utilize the custom job script 136 to collect data from yet another data source such as Salesforce or some other cloud-based software application, every hour.

In some embodiments, the ETL system 110 transforms or converts the extracted data from one format into another format compatible with data storage and/or usage with needed applications. For example, the ETL system 110 may utilize the custom job script 138 to obtain data from the data storage and query engine 120, organize it into a structured query language (SQL), analyze the SQL, and store the analyzed data, which may be in a different format, into the data storage and query engine 120 every hour. In various embodiments, data stored in the data storage and query engine 120 includes data from one or more data sources collected by the custom job scripts 132, 134, and 136 and then subsequently transformed (e.g., reformatted) by other custom job scripts.

The ETL system 110 may utilize custom job script 140 to publish data from the data storage and query engine 120 to Salesforce or some other cloud-based software application, every hour. In a simplified example, the job script 140 may gather data from the data storage and query engine 120, some or all of the gathered data may be analyzed by the custom job script 140. The gathered data may be organized and/or formatted in a way which corresponds or conforms with Salesforce. In one embodiment, the job script provides up-sale opportunities for the sales team. In some embodiments, the ETL system 110 may retrieve data stored in the data storage and query engine 120 and output the retrieved data in an organized manner using a publishing software such as Metabase or a customized software utilized by the example system 100.

Each of the custom job scripts 132, 134, 136, 138, and 140 may require customization for a particular function, such as read, convert, or write to or from a particular data source at a particular frequency. Furthermore, the custom job scripts 132, 134, 136, 138, and 140 may also require customization for a particular input data format or output data format of the data associated with the job script If one or more of the function, data source or frequency requires adjustment or change, the job script may need to be rewritten, since the custom job scripts 132, 134, 136, 138, and 140 are customized for a specified set of function, data source, and frequency. This makes it difficult to re-use job scripts, and for job scripts to be shared or utilized for other purposes. Similarly, this makes it difficult to scale and to make the utilization of data to solve analytical problems computationally efficient.

A claimed solution rooted in computer technology overcomes problems specifically arising in the realm of computer technology. In various embodiments, a computing system is configured to provide a centrally located data infrastructure that may be utilized by multiple enterprises to handle data from different sources, using different warehouses, using different data tools, and publishing for different purposes. The data infrastructure may unify a declarative language approach for collecting, transforming, harnessing, and publishing data. This centralized data infrastructure may also control synchronization and chronological control of ingested data at many different time rates from different sources without custom coding as described above. As such, this centralized, simplified approach enables different enterprises to utilize the same service (thereby overcoming the problem of each enterprises custom coding each solution in a piecemeal fashion). Further, unification and simplification of the approach through the declarative language enables improved scalability and computational efficiency. Further, changes or modifications to how the centralized system interacts with data sources, data warehouses, tools, and publication may improve the way any number of enterprises interact with their data, thereby enabling improvements to be shared across unrelated enterprises.

Figure 2:
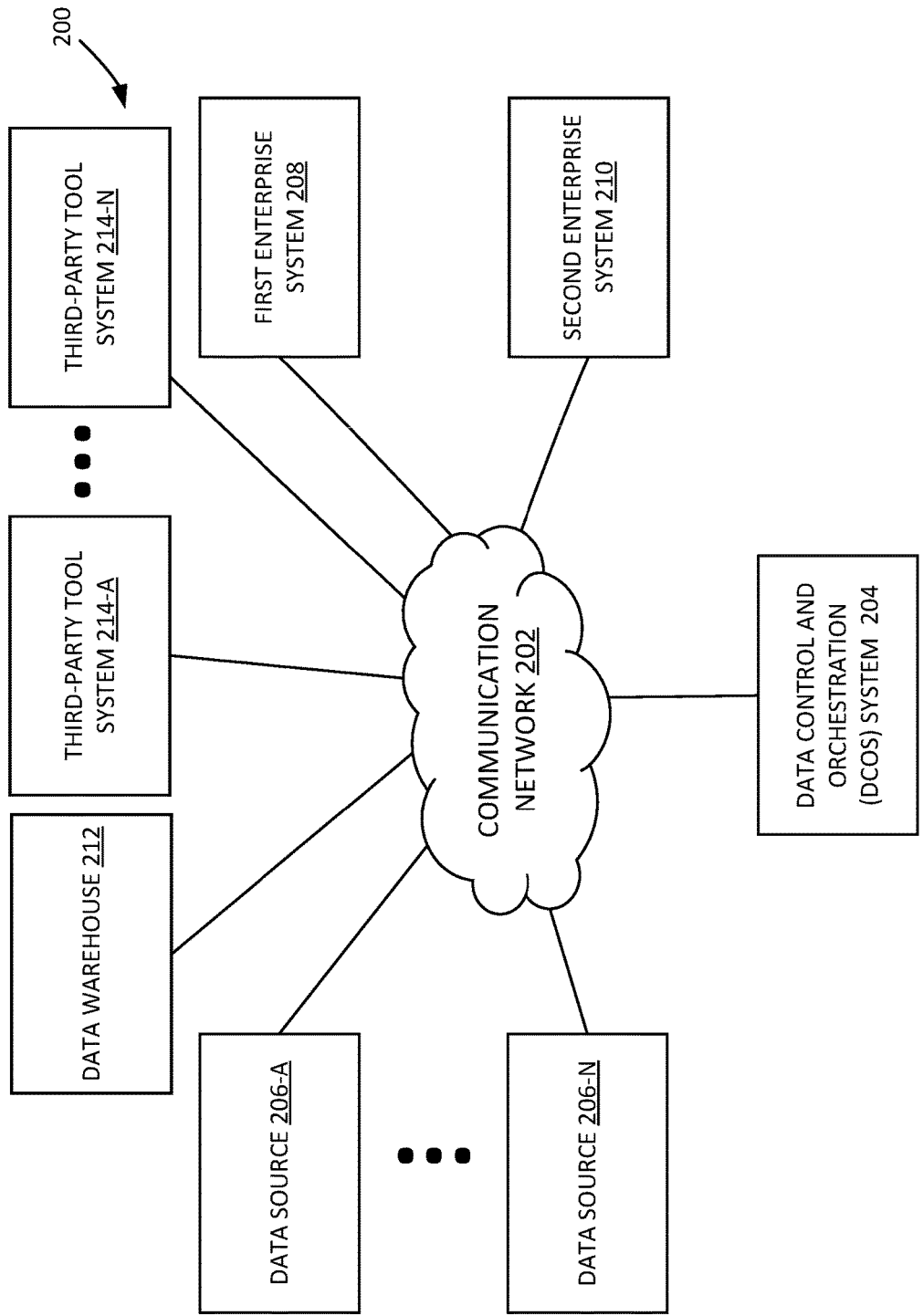
FIG. 2 depicts an example system 200 for centralized data control and orchestration according to some embodiments.

FIG. 2 depicts an example system 200 for centralized data control and orchestration according to some embodiments. The example system 200 includes a communication network 202, a data control and orchestration (DCOS) system 204, data sources 206-A to 206-N (individually, the data source 206, connectively, the data sources 206), a first enterprise system 208, and a second enterprise system 210, a data warehouse 212, and third-party tool systems 214A-N.

As discussed herein, data programming may be a way to elevate data scientists and data engineers from the manual work of orchestrating jobs and tasks in data pipelines. Data programming can be used to specify an end-to-end data flow (e.g., without needing to know the underlying environmental infrastructure) which may involve:

(1) Collecting or receiving data from different sources on a continual basis and centralizing that data into both a recoverable archive (e.g., in an AWS S3 data lake and an analytic data warehouse).
(2) Transforming that centralized data in one or many ways and keeping the transformed data up to date whenever the input data changes.
(3) Publishing the up-to-date transformed data to different destinations, including to operational systems and data science experiments.

The communications network 202 may represent one or more computer networks (e.g., LAN, WAN, or the like) or other transmission mediums. The communication network 202 may provide communication between systems 204-10 and/or other systems described herein. In some embodiments, the communication network 202 includes one or more computing devices, routers, cables, buses, and/or other network topologies (e.g., mesh, and the like). In some embodiments, the communication network 202 may be wired and/or wireless. In various embodiments, the communication network 202 may include the Internet, one or more wide area networks (WANs) or local area networks (LANs), one or more networks that may be public, private, IP-based, non-IP based, and so forth.

The data control and orchestration system (DCOS) 204 may be configured to centrally manage and control the flow of data from collection, storage, transformation, control of applications on the data for analysis, and publication. The DCOS 204 may be accessible by any number of users and/or enterprises to control all or part of their data flows.

In various embodiments, an enterprise system 208 may register with the DCOS 204 and provide data access information (e.g., identification of an account, identification of data, authentication keys, usernames, and the like) necessary to access data from any number of data sources 206A-N. In some embodiments, the DCOS 204 may be used to interact with different data sources to create accounts and systems to collect information for the enterprise system 208. The enterprise system 208 may also provide data warehouse information and third-party tool information to the DCOS 204. For example, the enterprise system 208 may identify one or more data lakes and/or data warehouses (e.g., data warehouse 212) to receive the information from any number of data sources as well as access information for the one or more data lakes and/or data warehouses information (e.g., identification of an account, identification of data, authentication keys, usernames, and the like). The enterprise system 208 may also identify one or more third-party tools (e.g., third-party tool systems 214A-N) to perform functions and publish information from or in the one or more data lakes and/or data warehouses. In this example, the enterprise system 208 may provide access information for the third-party tool system 214A-N (e.g., identification of an account, identification of data, authentication keys, usernames, and the like).

The DCOS 204 may provide a centralized interface to any number of enterprise systems to enable them to control their respective data flow with a single programming language (e.g., as opposed to the unique commands necessary for different data sources, different warehouses, and different third-party tool systems). For example, the DCOS 204 may provide an interface (e.g., a command interface) that enables an enterprise to enter a declarative language, such as SQL, to identify the data source, data, and functionality to take place. The DCOS 204 may identify the services through the interface and then translate the declarative language to a series of commands using translators that will subsequently be received by the external service (e.g., the data source 206, the data warehouse 212, and/or the third-party tool system 214) to perform the functions.

In various embodiments, the enterprise may enter commands within the interface to perform certain functions at given times or upon certain conditions being fulfilled. The DCOS 204 may utilize the translators to set up schedules and orchestration of the data flow at different times or events (e.g., when data has been ingested from different sources over time, certain transformation and applications may be performed).

It will be appreciated that different, unrelated enterprise systems may utilize the DCOS 204 to access different, unrelated data in different sources and perform various transformations, applications, and publications on the data. As such, different enterprises may utilize the centralized DCOS 204 without custom coding. Similarly, as improvements and new services become available by different sources, warehouses, lakes, tool systems and the like, the DCO 204 may create new translators for those improvement and new services thereby allowing any number of enterprises to take advantage by utilizing the language in the interface of the DCOS 204.

The data sources 206 may function to store original data and provide original data to one or more other systems. The data sources 206 may store different types of original data, such as original data having different data formats. Data formats may refer to data types, file formats, content formats, schemas, and/or the like. In some embodiments, a schema refers to the organization of data as a map of how a datastore is constructed (e.g., divided into database tables in the example of a relational database). A schema may define a set of formulas (e.g., integrity constraints) imposed on a datastore. Integrity constraints may ensure compatibility between various parts of the schema. All constraints may be expressed in the same language. In various embodiments, functionality of the data sources 206 may be performed by one or more servers (e.g., a cloud-based server) and/or other computing devices.

In some embodiments, the data sources 206 may include various database systems (e.g., Postgres, MySQL, Dynamo DB), data services (e.g., Sensortower, Second Measure) and/or various platforms that store and/or provide data (e.g., Facebook, Crunchbase, Salesforce). Original data may be stored and/or accessed using different data formats and/or APIs. For example, original data may include transaction data, customer relationship management (CRM) data, and/or the like each of which may be stored by a different data source. Any or all of the data sources depicted in FIG. 2 may be independent of each other. The same may also be true for tool systems 106 and/or deployment systems 108.

Data sources 206 may include systems that are internal and/or external with respect to a third-party entity. For example, an internal data source 206 may include a system operated and/or controlled by a particular client entity (e.g., first enterprise system 208). In another example, an external data source 206 may include a system that is not operated and/or controlled by the particular client entity.

The first enterprise system 208 and the second enterprise system 210 may be any number of devices associated with the different enterprise systems. Different enterprises may control the first and second enterprise systems. The first and second enterprise systems may be remote from each other and the first and second enterprises may be unrelated to each other (i.e., owned and operated by separate entities that may perform different businesses. Although FIG. 1 depicts enterprise systems, it will be appreciated that there may be any number of organization systems (e.g., nonprofit systems, organization systems, company systems, corporate systems, partnership systems, and/or the like).

Data warehouse 212 may be any data warehouse or data lake configured to collect and store data (e.g., form the data sources 206A-N). A data warehouse 212 may be a central repository of integrated data from one or more disparate sources. In some embodiments, the dare warehouse 212 may maintain a copy of information from the source transaction systems.

The third-party tool systems 214A-N may each function to perform various analysis and/or reporting functions. In some embodiments, functionality of the third-party tool systems 214A-N may be performed by one or more servers (e.g., cloud-based servers) and/or other computing devices. For example, the third-party tool systems 214A-N may include JupyterHub, Metabase, EMR, and/or the like. The third-party tool systems 214A-N may be triggered by a deployed data infrastructure stack, or portion thereof (e.g., one or more harness functions by the DCOS 204).

The third-party tool systems 214A-N may utilize functions to execute a data infrastructure stack deployed therein. In various embodiments, functionality of the third-party tool systems 214A-N may be performed by one or more servers (e.g., a cloud-based server) and/or other computing devices. In some embodiments, the third-party tool systems 214A-N may be implemented by a cloud-computing platform.

Although there is only one data warehouse 212 depicted in FIG. 2, there may be any number of data warehouses 212 utilized by any number of enterprise systems.

Figure 3:
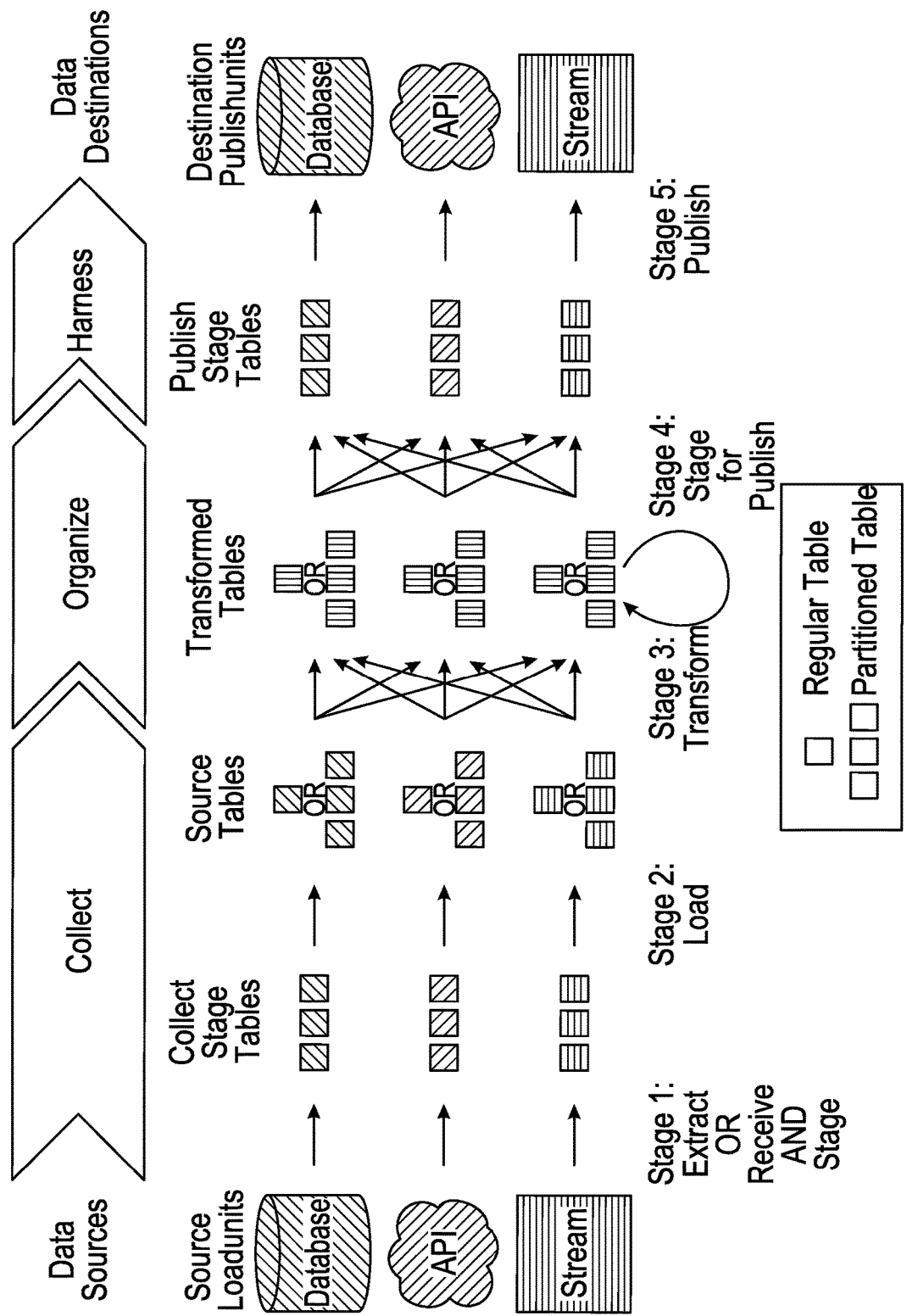
FIG. 3 depicts an example data flow model in some embodiments.

FIG. 3 depicts an example data flow model in some embodiments. Data flow for most enterprises involves several phases including collecting from different data sources, organizing the data to be ready for application of various data tools, harnessing data tools to apply to the organized data, and providing the data to different destinations.

The DCOS 204 may control the different systems to collect data from data sources, organize the data, harness applications and tools and publish to data destinations.

Source Loadunits may be objects/tables/streams that need to be centralized. They may exist in data source systems that are external to the DCOS 204. APIs define ways of pulling different objects that are relevant to that application. Each such object may become a source loadunit.

Data from source Loadunits may be placed in separate collect stage tables to be loaded to source tables. In stage 3, the DCOS 204 may utilize translators of the commands provided by the enterprise(s) to organize the data (e.g., transform tables containing information from any number of source Loadunits) and then provide all or different combinations organized information to the stage tables to be ultimately published.

FIG. 3 depicts information across the data flow as being placed in regular and/or partitioned tables which is further discussed herein.

Figure 4:
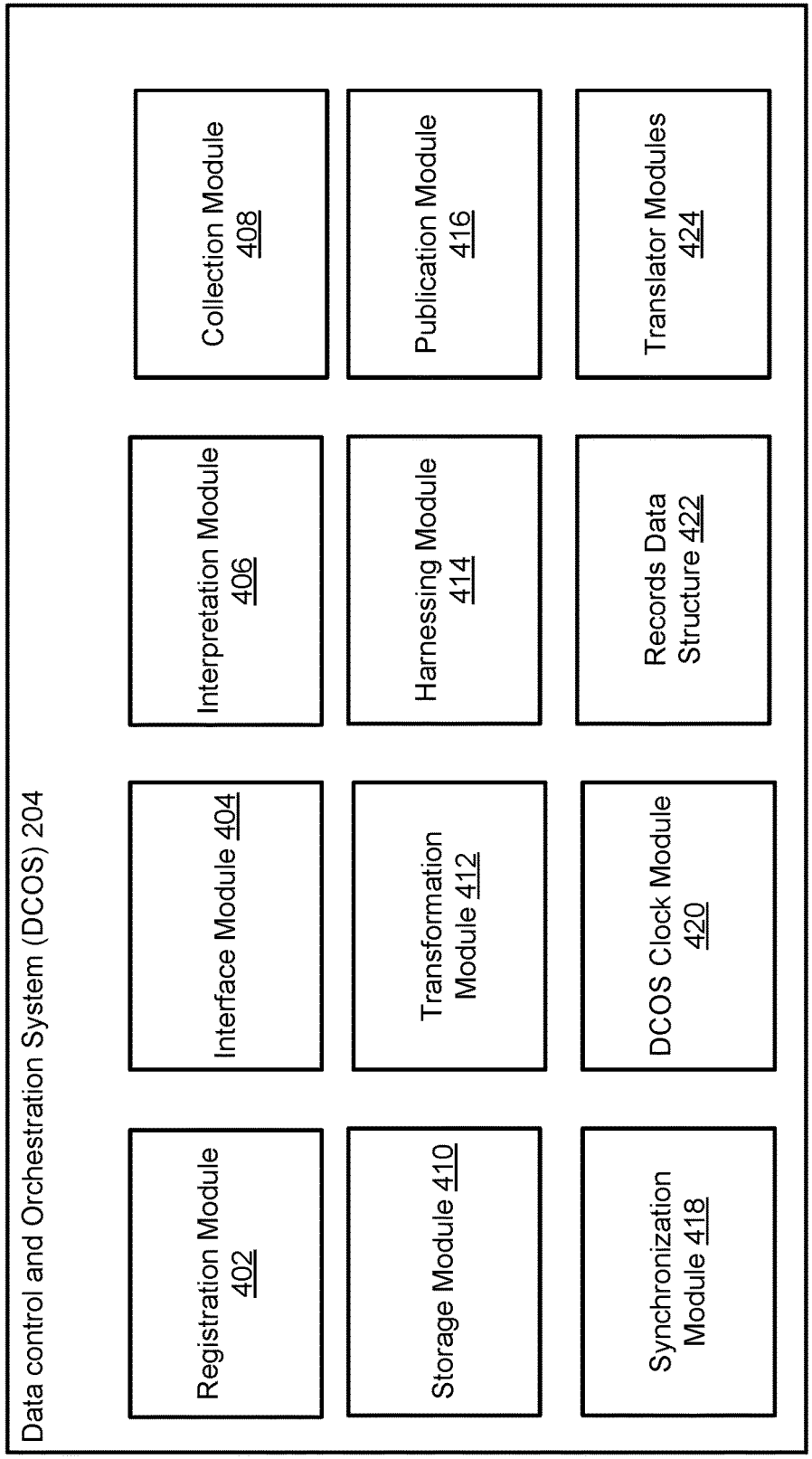
FIG. 4 depicts an example of the data control and orchestration system (DCOS) 204 in some embodiments.

FIG. 4 depicts an example of the data control and orchestration system (DCOS) 204 in some embodiments. The DCOS 204 may include a registration module 402, an interface module 404, an interpretation module 406, collection module 408, storage module 410, transformation module 412, harnessing module 414, publication module 416, synchronization module 418, DCOS clock module 420, a records data structure 422, and translator modules 424.

The registration module 402 allows different users of different enterprises to register with the DCOS 204 and log into the DCOS 204. The registration process enables the different enterprises to identify the data they wish to ingest from different data sources and/or access information (e.g., usernames, passwords, encryption keys, and/or other configuration information) for different data sources. Similarly, the registration process allows different enterprises to identify different applications and/or provide access information for data warehouses, data lakes, third-party tools, destinations for publication, and/or the like. As such, the DCOS 204 may be a unified, centralized interface for controlling data throughout the data flow, regardless of the different sources, tools, transformations, and destinations. Similarly, a single declarative language may be utilized to control the data flow to and from different sources, tools, transformations, and destinations.

Figure 5:
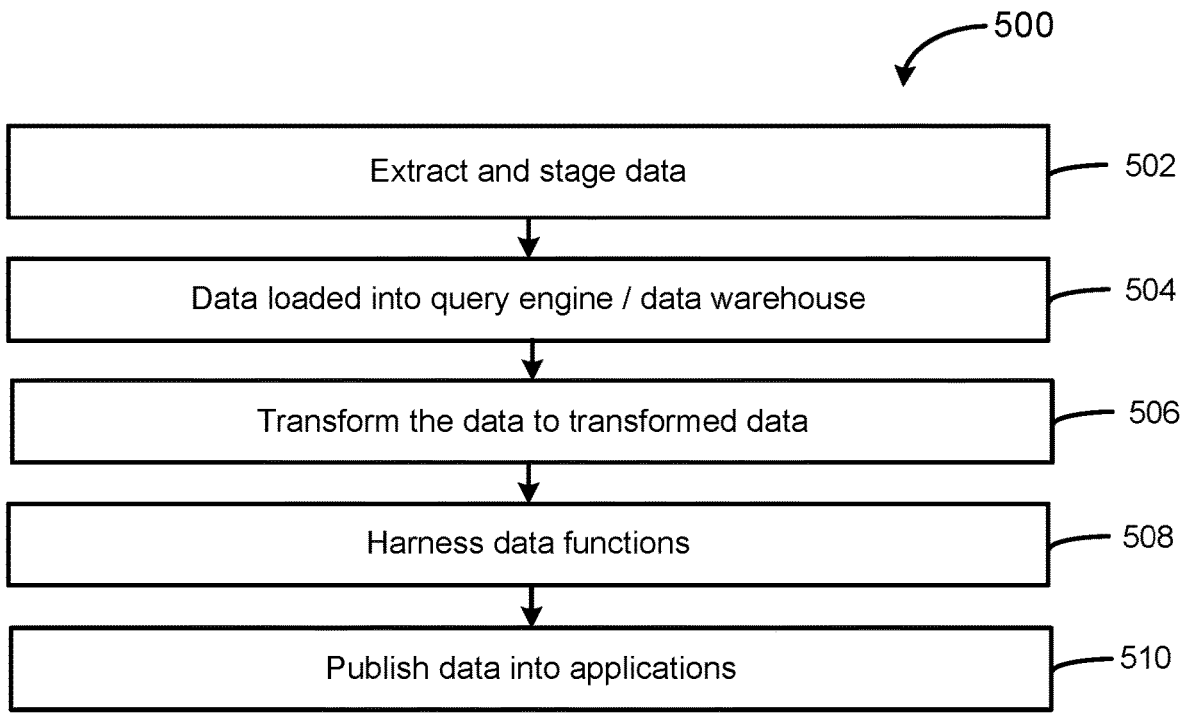
FIG. 5 is a flowchart of an example data flow in some embodiments.
Figure 6:
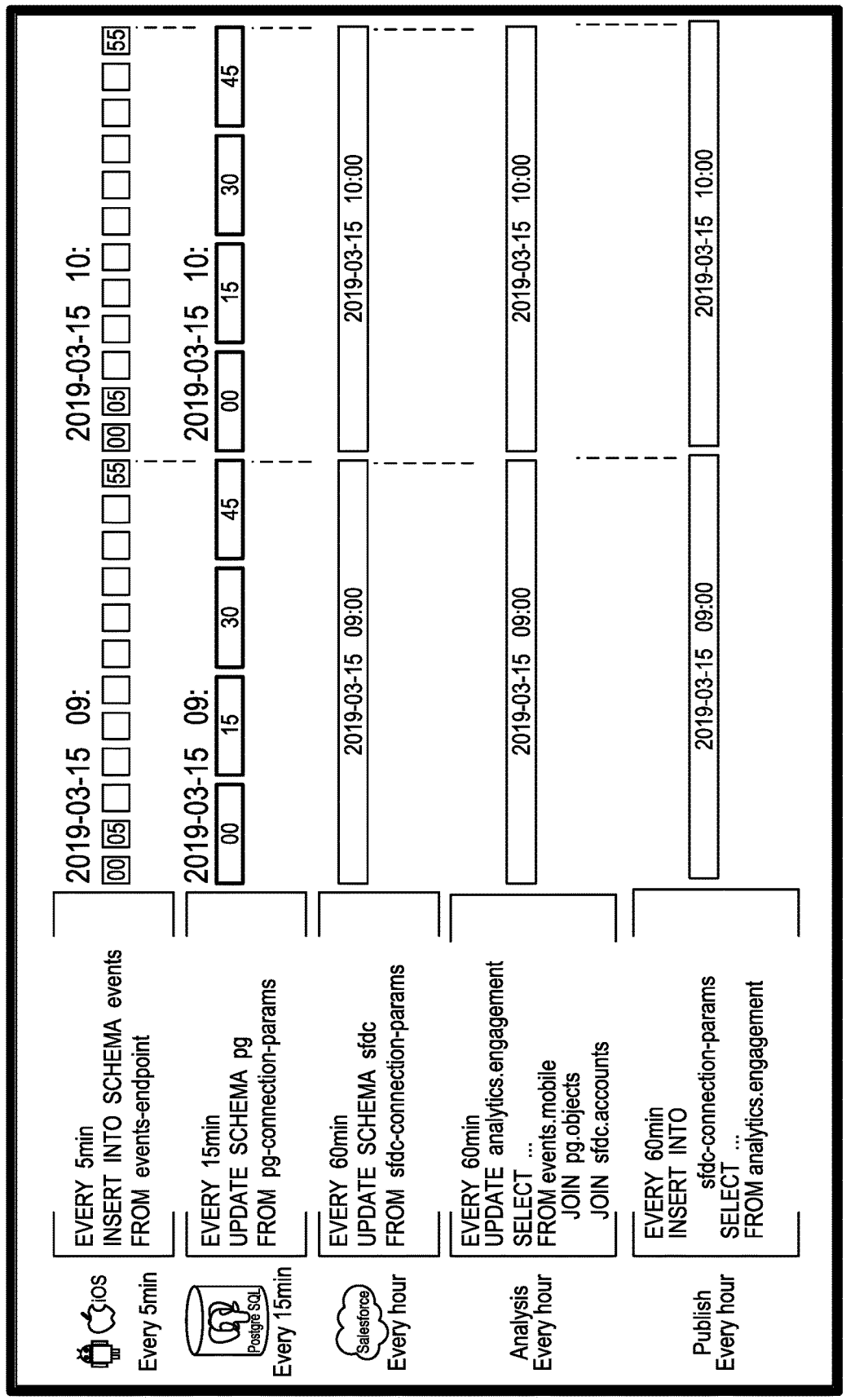
FIG. 6 is a diagram of an example computer system for implementing the features disclosed herein.

The interface module 404 and interpretation module 406 may provide a centralized interface and unifying language to control collecting, transforming, harnessing, and publishing data (e.g., example steps described in FIG. 5). In various embodiments, a single declarative language may be used to ultimately interface with different data sources, data warehouses, data likes, tools, and the like. Many or all of these applications (e.g., different data sources, data warehouses, data likes, tools) may utilize their own APIs, languages, and communication protocols. The DCOS 204 may utilize a plurality of different translators (e.g., stored in the translator modules 424) that provide the commands to the different applications (e.g., different data sources, data warehouses, data likes, tools) based on commands received from the single declarative language. As such, users at different enterprises may utilize the declarative language to control the data flow through the pipeline end-to-end or along any portion of the pipeline.

In some examples, the DCOS 204 utilizes SQL as a data programming interface language. SQL is a common language for controlling SQL databases, however, it has not been utilized as a centralized language for controlling aspects of data flow throughout a pipeline. In this example, users at different enterprises may utilize the communication network 102 to view a data flow interface provided by the interface module 404. The user may provide commands in SQL, and the interpretation module 406 may interpret the SQL commands and retrieve the necessary translations for the different applications and data that are identified.

The interface between each of the steps in a data flow may be the table schema and update model. So, each step of the data flow may define input tables and output tables. In one example, through a SQL statement with comment extensions like:

```
/**
* @datacoral O-1.0.0
* @matview-schema analytics
* @matview-name engagement
* @matview-type partitioned - output table is partitioned
* @matview-update-mode append
* @interval-in-minutes 60- update frequency
* @output-warehouse myredshift - name of the datastore where the table resides
*/
- the actual business logic of the data transformation
SELECT ...
FROM events.mobile - input table - data dependency that is automatically inferred
    JOIN pg.objects - input table - data dependency that is automatically inferred
    JOIN sfdc.accounts - input table - data dependency that is automatically inferred
```

In this example, for each of the tables that are produced in each step of a data flow, the following attributes are specified/inferred by parsing the comments statement like the one above:
  Name of the data store where the table resides
  Name of the schema
  Name of the table
  Type of the table—regular or partitioned
  Update frequency—essentially indicates the set of valid timelabels for a table
  Update semantics of one of REPLACE/APPEND/MERGE—indicates whether:
    all rows of a table have the same timelabel (replace)
    once rows are written with a given timelabel, the timelabel of the rows doesn't change (append), or
    the timelabel of a row is the same as when it was last updated (merge)

With the above information available for each table in a data flow, the end-to-end data pipeline can be automatically generated.

The collection module 408 may collect data from any number of data sources based on translated commands that are based on input in the interface of the interface module. The collection module 408 may ingest data from any number of sources and store the data in a data warehouse or data lake.

The DCOS 204 may take advantage of common data management practices used within data warehouses. For example, warehouses support multiple modes of updating the content of a table, these may include, for example:

REPLACE mode replaces all the rows of a table with a new set of rows.

APPEND mode adds additional rows to a table. Once a row has been inserted, in some embodiments, the row is not updated or deleted.

MERGE mode updates, inserts, and deletes rows in the table that are captured via change data capture from source systems.

After the collection module 408 ingests the data, the storage module 410 may store the data in a data warehouse or data lake (e.g., such as Redshift, Snowflake, Athena, Hive, or Databricks Delta). In some embodiments, the storage module 410 may populate data into two different types of tables including, for example, regular tables or partitioned tables.

Regular tables are what most users are familiar with in a warehouse or a query engine. Regular tables may be suitable for small and medium-sized tables, supporting efficient REPLACE and MERGE semantics in addition to APPEND semantics and when they don't need periodic pruning of old rows via retention rules. Most data warehouses support regular tables, however there are some query engines like Hive that are better suited for append-only modes of change. In those cases, partitioned tables may be preferred.

Partitioned Tables may be suitable large tables, tables supporting the APPEND semantics, and those that require efficient, periodic pruning of old rows via retention rules. A single partitioned table may contain multiple partitions, each of which corresponds to a particular column value in each row.

Unfortunately, different data warehouses do not treat partition tables consistently from product to product. For example, some data warehouses like Redshift and Snowflake don't support partitioned tables natively. In those cases, the DCOS 204 makes it easy to have partitioned tables by using individual tables for each partition and creating a UNION ALL view on top. Queries on partitioned tables are rewritten to only query specific partition tables. Data warehouses like Athena, Hive, and Databricks Delta, that have a filesystem-oriented storage are much more amenable to partitioned tables. Partitioned tables are especially useful when there is a need to maintain an audit trail related to where and when the data entered or exited the pipeline.

The transformation module 412 may perform reformatting and/or organization of data for subsequent tables, combining data from different sources, for preparation of harnessing different third-party applications, and/or publication. The transformation module 412 may utilize commands from the translator(s) based on information from the interface module 404.

For example, the there may be translator structures that include a structure for communication with a particular service. The interpretation module 406 may configure or complete the translator structure based on the received language from the enterprise to complete the translation command(s) to provide to the particular service. There may be any number of translator structures stored in the translator module 424. It will be appreciate that new translator structures may be added as new services are provided by different, unrelated entities. As a result, all unrelated enterprise users may gain the benefit of interacting with new services through the single language (e.g., SQL language) as they become available. Similarly, the DCOS 204 may be utilized to generate and update translator structures based on updated APIs or changes in existing services provided by third-party services. As a result, the service provided by the DCOS 204 enables different unrelated users to take advantage of the new and/or updated services without learning new custom coding or custom binding data pipelines.

The harnessing module 414 may utilize commands from the translator(s) to control third-party tools, tools available in the data warehouse, internal tools, applications and the like to the transformed data (e.g., different combinations of data) to generate results. The harnessing module 414 may utilize any number of applications including analytical applications, artificial intelligence, and the like.

The publication module 416 may publish all or some of the results from the harnessing module 414 based on commands from the translators based on instructions from the interface module 404.

The synchronization module 418 may synchronize or orchestrate the ingesting of data, transformation, and/or harnessing applications.

When there is data from very different kinds of sources for analysis, there are significant problems in trying to build productionalize/operationalize data flows of those transformations. For example, assuming there are three different data sources:

1. Event stream pushing events to an http endpoint (User info). Event stream is being batched and the batch is done every 5 minutes.
2. CDC to capture changes from an RDBMS (Payments database). Changes from here are batching every 15 minutes
3. Sales data via Salesforce API calls (account, contract value). Data is being pulled every hour If the enterprise wished to do an analysis that requires joining data coming from these sources, the enterprise needs to make sure that there is some amount of synchronization that happens so that the result is the right kind of data. When the enterprise attempts to join data from the three tables, the enterprise needs to make sure that data from them is synchronized.

Keeping synchronization is difficult in this example because:

1. Event stream is being batched every 5 minutes
2. CDC is batched every 15 minutes
3. Salesforce API data is collected every hour ingesting the data Assuming the enterprise wants to perform the analysis every hour, the enterprise needs to make sure that at least 1 hours worth of data is available to be analyzed. The enterprise will have to make sure that you have the appropriate number of batches of data coming in from each source. Here is what it means for each data source:

1. twelve batches of event stream data, since that equals to 1 hour
2. four batches of CDC data
3. one batch of salesforce data In the prior art, for each table, a job will be created (i.e., there will be a job each for event stream ($J_{ES}$), CDC($J_{CDC}$) and salesforce ($J_{SF}$)). If an analytics query were to run today, you will first need to create a job for the analytics query itself. Lets call this job $J_Q$ ... $J_Q$ would need to wait for one instance of $J_{SF}$, four instances of $J_{CDC}$ and twelve instances of $J_{ES}$. The analytics job itself just runs a SQL query in the analytics engine to generate derived tables. Finally, there would be a publisher Job ($J_{PUB}$) that publishes data in the derived table from the analytics engine back to Salesforce.

All of the orchestration logic is built into the scripts that represent the jobs. These scripts constitute a data pipeline that are hand-coded. These scripts interact with ETL systems or schedulers so that the right orchestration happens. Each time a change is needed, all the job scripts need to be examined and changed as needed for both orchestration updates as well as any business logic updates.

In various embodiments, the same can be accomplished with just writing SQL-like code for micro-batch oriented data flows. The user indicates exactly what granularity of data they need at any step (see the EVERY clause). The interpretation module 406 automatically infers the data dependencies and, based on the granularity of the steps, it generates the micro-batch data pipelines along with the orchestration logic.

For example, in some embodiments, each micro batch is given a label based on time, called the Timelabel. The actual orchestration of the micro-batch data pipeline is governed by the DCOS clock module 420 which is a clock of the DCOS 204.

In some embodiments, the DCOS 204 data pipeline flows by follow a micro-batch processing model. In FIG. 3, each square may represent a Regular or Partitioned Table and is a batch of data. The batches of data first get defined and created when being received/retrieved from the different data sources by the collect data functions. Collect Data Functions (e.g., from the collection module 408) create each batch by building up rows of data from each source as "loadunits" based on time windows defined by the Enterprise (e.g., provided in the interface). Once the time window duration size is determined for a given source loadunit, that duration length becomes the same size for all batches of that loadunit. The batch of rows is given a label which is based on the time window during which it was executed. This batch label is called a Timelabel.

The timelabel could be based on either one of the following measurements:

data time window—is a range of timestamps found in each row of the data, if available, and usually originates from the original source system.

arrival time window—is a wall-clock time window that marks when the row was collected (received or extracted) during processing.

In this model, batches are deemed complete when all data for a given timelabel window has been received. If data is being extracted from the source, and it is possible for the extraction logic to have a predicate that is based on data time, like when a customer pressed the login button, data time window based batching can be chosen. DTW batching allows for more easily understandable analytics. If there can be a guarantee that all data for a given time window can be contained within a given batch, that guarantee allows for the analyst to know exactly what data they are querying by seeking a given batch.

Figure 24:
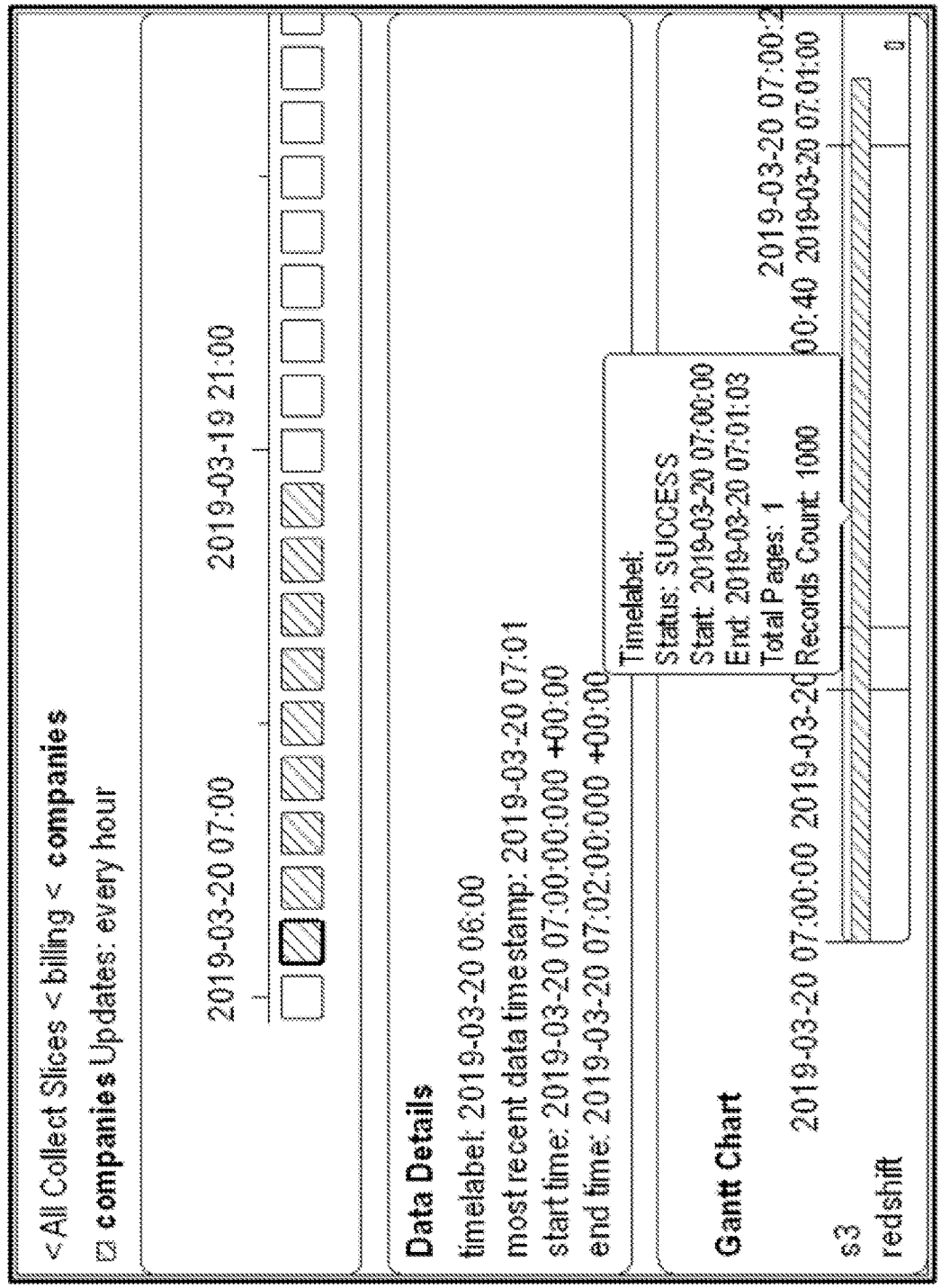
FIG. 24 depicts data time window collection interval according to some embodiments.

FIG. 24 shows the data time window collection interval and details for the 6 AM timelabel (2019-03-20 06:00), whose query process begins at 7 AM and ends two minutes later.

In this example model, rows that are received are collected into batches are deemed completed at a certain wall-clock time. Batches can contain rows with timestamps that might be outside of the arrival time window. Arrival time window based batching is chosen for sources from which data is being received (like event streams, changelogs, etc.) rather than extracted. In the case of ATW batching, there is no guarantee that all rows for a given time window are in the same batch, so an analyst may have has to query multiple batches in order to be guaranteed that all data for a given data time window are being queried. In order to prevent full-table scans all the time to handle out-of-order arriving data, specific processing steps are needed to 'close the books' for a given data time window. More on closing books (data bookkeeping) later. Examples of ATW-based batching include events coming in from applications, or change logs from production databases.

Mapping this back to how partition tables are divided, the size of the time window is the same for each partition within a Collect Stage Table. This size is also the frequency at which new data is populated in batches into the Source Table. In order to maintain full auditability, the DCOS 204 may mandate that the Stage Table is partitioned, and each new data batch is populated into a new, separate partition. Once the partition is written, it is immutable. In a partitioned table, there is a one-to-one mapping between a timelabel and its partition.

FIG. 8 is a depiction of how data arrives, timing declaration in a SQL from the unified interface, and batches of timelables generated by the translators and the synchronization module 418. Data from Apple and Android applications every five minutes, collections from PostgreSQ occur every fifteen minutes, and salesforce every hour. New analytics updates are run in Reshift every hour and updates are published to Salesforce each hour.

In some embodiments, a timelabel is also a version number that can be used to line up updates on tables that must be consistent with one another. The fact that a single timelabel value can be used to represent the entire state of a set of tables at a point in time, means that the timelabel itself could be deemed to be a clock tick interval of the entire set of tables. Similarly, the timelabel may form a clock tick for an entire data flow, if you imagine it tick by tick by tick. And in general, timelabels can be treated as clock ticks for the whole system with all the data flows. Timelabels are a very compact way of completely representing all valid versions of tables in and throughout the entire system.

Timelabels become very useful when you consider what they help in terms of keeping the data pipeline consistent as it flows, and as its flow changes. Timelabels automatically help with versioning, consistency, orchestration and auditability. For example, knowing the version (timelabel) for one table, one can find all the versions (timelabels) of the corresponding upstream and downstream tables without any additional bookkeeping.

Further, when MERGE or REPLACE semantics are used, the timelabel is also a version number for the table. With each new batched update, a new version of the table may be deemed to be created. And, when a new version is created for a particular table, the downstream tables in its data flow also need to be recomputed to create versions that make the downstream tables consistent with the upstream tables. Timelabels, in this case, enforce downstream data consistency through the entire pipeline.

The batching model and the notion of a Timelabel may be intimately tied to provide a consistent batch processing model where the semantics of the updates are clear and there is fully visibility into the end-to-end data flow. In this manner, the DCOS 204 may orchestrate pipeline flow such that updates to a specific downstream table are synchronized automatically after the updates to each of its upstream tables occur.

In various embodiments, the table/timelabel statuses essentially form the audit log for how the data inside of the database was created and subsequently updated. By knowing this information, the dCOS 204 may be able to look upstream at the data as well, which is how we can determine its lineage as well as flow and provide full data provenance visibility.

FIG. 5 is a flowchart of an example data flow in some embodiments. Regular and partitioned tables may be utilized within each stage of the flow. Partitioned tables scale effectively and ensure that all your data is persisted as it moves through the flow, while normal tables may be used during the transformation stages in the pipeline.

In step 502, data is extracted/received and staged. In this step, this is the "collect data" function that either extracts or receives data from external data source Load units (i.e., different data sources), optionally groups the data into batches based on the Batching Model described in a later post, and stores into partitions in tables in a staging area which is typically a file-system-based storage, like AWS S3.

In step 504, data is loads staged batches into a query engine/data warehouse. The data may be loaded into source tables in the warehouse. The source tables may, for example, be either regular or partitioned tables in the data warehouse. The source tables can be either regular or partitioned tables in the warehouse. The tables may be called "Source Tables" because they match the data in staging and the source. APPEND/MERGE/REPLACE modes may be supported in regular tables and APPEND mode may be supported for partitioned tables.

In step 506, a set of transformations may be performed on all or different portions of the data. For example, transformations may be performed within different warehouses by Organize Data Functions, starting from the Source Tables (as the Upstream Tables) where each transformation results in a Downstream Table and the downstream tables can then be upstream tables to the further downstream transformations in the flow. The transformations may happen in batches as well. Transformations are represented as Transformed Tables in the data warehouses which can be either regular or partitioned tables based on the user.

In step 508, Harness Data Functions publish data from some of the Source Tables or the Transformed Tables in the warehouses to external applications and databases. Each batch of data that is published is first staged in Publish Stage Tables. The published stage tables may be mandated to be partitioned (just like collect stage tables).

In step 510, each staged partition may then published into applications via API calls or to databases.

Tables within a database or extracts of data from the tables within a database form a loadunit. A single stream with a given schema may become one loadunit. Collect stage tables may be tables that are for bookkeeping. These tables may be, in some embodiments, APPEND-only and may be always PARTITIONED. Users can decide whether they want the source tables to be REGULAR or PARTITIONED and can be updated in any of APPEND/REPLACE/MERGE modes. Users can decide whether the transformed tables are REGULAR or PARTITIONED and can be updated in any of APPEND/REPLACE/MERGE modes. Publish stage tables may be for bookkeeping. In some embodiments, publish stage tables are APPEND-only and may be always PARTITIONED.

In various embodiments:

Destination publishunits are objects/tables/streams that the user wants to see published to target destinations as "publish data."

For APIs, REPLACE/APPEND/MERGE publish modes may be allowed depending on the destination.

For databases, REPLACE/APPEND/MERGE publish modes may be allowed depending on the destination.

For a stream, APPEND-only publish mode allowed.

Figure 7:
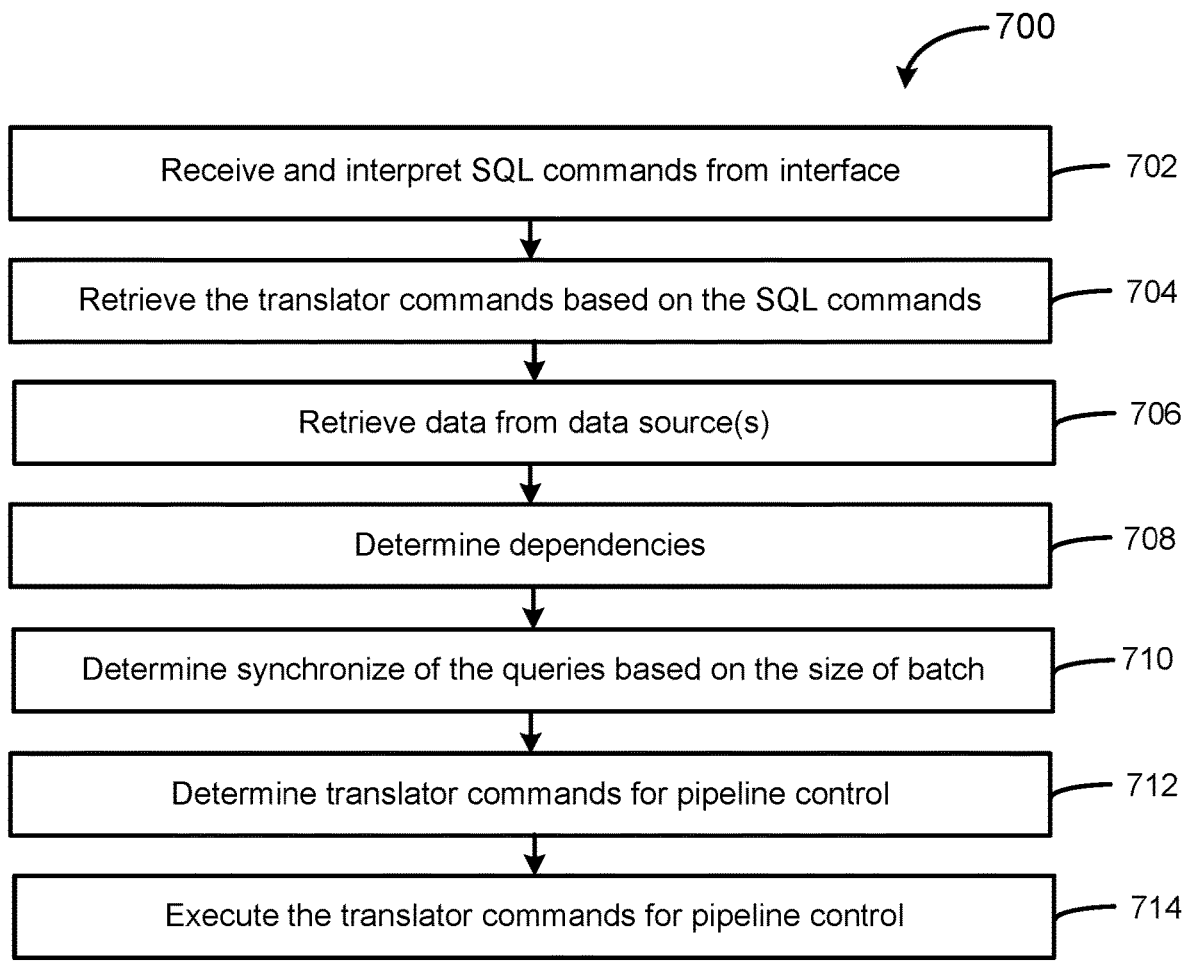
FIG. 7 depicts an example system to orchestrate data collection from data storage, analysis of data in data storage and publish the analyzed data according to existing solutions.

FIG. 7 is a flowchart depicting a method of time labeling in one example. To set the stage for the example, the goal is to calculate an up-to-date customer health score so that data scientists can work to better predict troubled customers and alert the account management team.

In step 702, the interpretation module 406 interprets the SQL commands from the interface. In step 704, the interpretation module 406 may retrieve the correct translator commands based on the SQL commands. The interpretation module 406 may retrieve access information (e.g., usernames, passwords, access rights, data locations) from an enterprise's account and identify schemas, names, and events from the SQL to identify the correct translator command(s) for the specific service (e.g., data source, data warehouse, and/or tool).

A set of queries on raw tables like the ones in the boxes below automatically generate a pipeline that creates an up-to-date customer_health table, with the health score for each customer based on the different signals about the customer behavior.

```
billingdb/lifetime_value.dpl
/**
 * @datacoral O-1.0.0
 * @matview-schema billingdb
 * @matview-name lifetime_value
 * @matview-type regular
 * @interval-in-minutes 120
 */
/**
 * @datacoral O-1.0.0
 * @matview-schema billingdb
 * @matview-name lifetime_value
 * @matview-type regular
 * @interval-in-minutes 120
 */
SELECT
    o.user_id,
    sum(substring(amount, 2)) as lifetime_value
FROM
    billingdb.orders o,
    billingdb.invoices i
WHERE
    o.user_id = i.user_id
    AND i.status != 'Pending'
GROUP BY
    o.user_id;
zendesk/satisfaction.dpl
/**
 * @datacoral O-1.0.0
 * @matview-schema zendesk
 * @matview-name satisfaction
 * @matview-type regular
 * @interval-in-minutes 60
 */
SELELCT
    t.requester_id,
    t.satisfaction_rating_score,
    tm.full_resolution_time_in_minutes_business,
    tm.first_resolution_time_in_minutes_business
```

```
FROM
    zendesk.tickets t,
    zendesk.ticket_metrics tm
WHERE
    t.id = tm.ticket_id;
events/engagement.dpl
/**
 * @datacoral O-1.0.0
 * @matview-schema events
 * @matview-name engagement
 * @matview-type regular
 * @interval-in-minutes 30
 */
SELECT
    h.user_id,
    max(h.eventtime) latest_device_sync,
    max(sa.eventtime) latest_web_event,
    count(1) AS touchpoints
FROM
    webevents.mv_siteactivity sa,
    deviceevents.mv_heartbeat h
WHERE
    h.user_id = sa.user_id
GROUP BY
    h.user_id;
public/customer_health.dpl
/**
 * @datacoral O-1.0.0
 * @matview-schema public
 * @matview-name customer_health
 * @matview-type regular
 * @interval-in-minutes 240
 */
SELECT
    l.user_id,
    lifetime_value * satisfaction_rating_score * touchpoints AS health_score
FROM
    billingdb.mv_lifetime_value l,
    zendesk.mv_satisfaction,
    events.mv_engagement;
```

In step 704, the collection module 408 retrieves data from one or more sources. For example, data comes from the following sources utilizing translated commands that collect data from production systems:

webevents: batched every 30 minutes deviceevents: batched every 30 minutes zendesk: brought in every hour billing: billing data from a MySQL database brought in every two hours It will be appreciated that the steps 702-708 may be performed in a different order depending on the embodiment(s).

Figure 25:
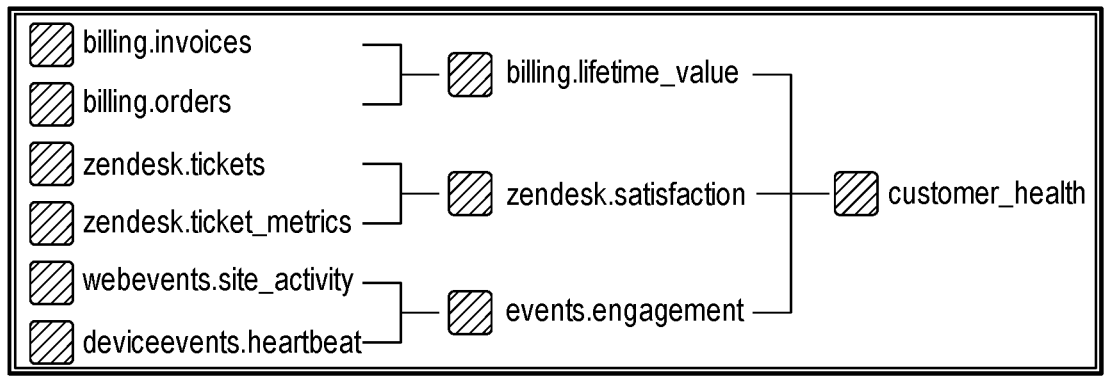
FIG. 25 depicts a Directed Acyclic Graph of dependencies according to some embodiments.

In optional step 708, the transformation module 412 may determine dependencies. In one example, the DCOS 204 may then compile the queries above into a Directed Acyclic Graph (DAG) of dependencies, as shown in FIG. 25.

In addition to the schema-based DAG, in step 710, the synchronization module 418 may determine how to synchronize the execution of the queries based on the size of the batch that each query is processing. For example, since customer_health needs to be updated every four hours, the synchronization module 418 automatically determines that interval before the customer_health query runs.

Figure 26:
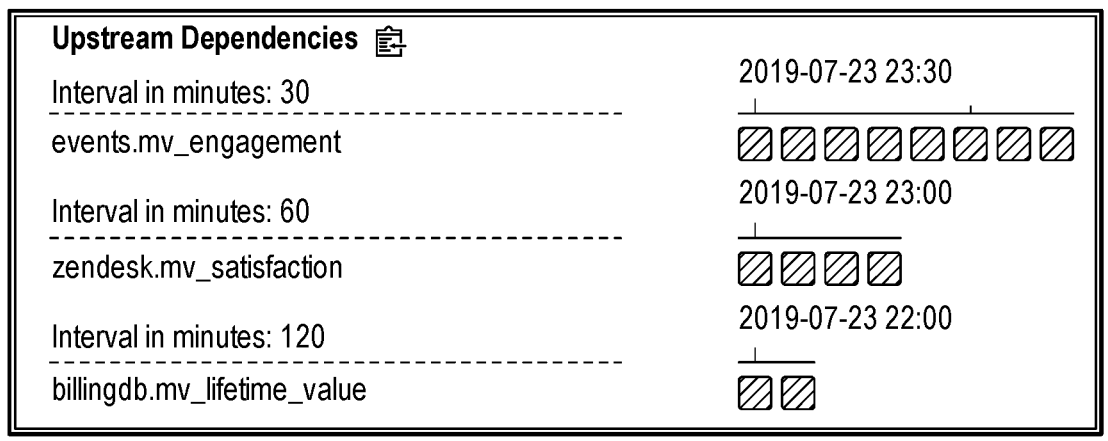
FIG. 26 depicts an example of the set of queries in a pipeline and assigned dependencies according to some embodiments.

The synchronization module 418 may determine the set of queries into a pipeline with the proper dependencies automatically assigned as seen in FIG. 26.

In step 712, the interpretation module 406 determines translator commands for pipeline control of the data source(s), data warehouse(s), and third-party tools as necessarily. In step 714, the interpretation module 406 executes the commands for the pipeline.

It will be appreciated that by condensing the command structure in a single interface with a single language for an enterprise, the DCOS 204 greatly simplifies pipeline creation and data control. As a result, multiple, unrelated enterprises may create and control data flow through different services from a centralized service (thereby solving a problem related to computer technology—namely, the complexity of handling different languages, protocols, services, devices, data, and synchronization).

In addition to providing an automated way of building a pipeline with just SQL, the DCOS 204 offers a unique "compile step" to the pipeline that checks the integrity of the pipeline. Each query result's schema may form the data interface for the downstream queries. When an enterprise modifies any of the queries in the DAG, the DCOS 204 checks if the change can break any of the downstream queries.

This is similar to a situation where a compiler errors out when there is a change of the signature of a function and there is not a similar change at all the call-sites of the function in other parts of the code. In some embodiments, an update-set can be applied to the DAG with confidence; there will not be any breakages in the data flow due to schema changes.

In some embodiments, the DCOS 204 offers the ability to publish data to AWS-based and third-party systems so they, too, may harness the results of the transformations.

In this example, the DCOS 204 can set the final stage of this data pipeline to include an update to Salesforce to update the customer_health_score in the account object in the CRM system. The ability to publish data to systems, analytic tools, and warehouses such as an Amazon Athena-accessible data lake completes the example.

In some embodiments, unlike traditional solutions using custom coding, a data infrastructure stack may be generated within a short period of time (e.g., several minutes), and may be deployed within a third-party client entity account (e.g., a client account) of an on-demand and/or "serverless" cloud-computing platform (e.g., AWS, AWS Lambda). For example, rather than custom programming and/or coordinating services, the systems and methods described herein may generate the data infrastructure stack from a set of predefined data infrastructure components (or, "slices"). This may facilitate rapid generation and deployment of data infrastructure stacks, and also allow existing data infrastructure stacks to be easily updated and/or extended (e.g., by adding, updating, and/or removing slices). In some embodiments, the slices and data infrastructure stacks are serverless-native, which may allow, for example, the slices and data infrastructure stacks to auto-scale and/or otherwise achieve improved scalability.

Figure 9:
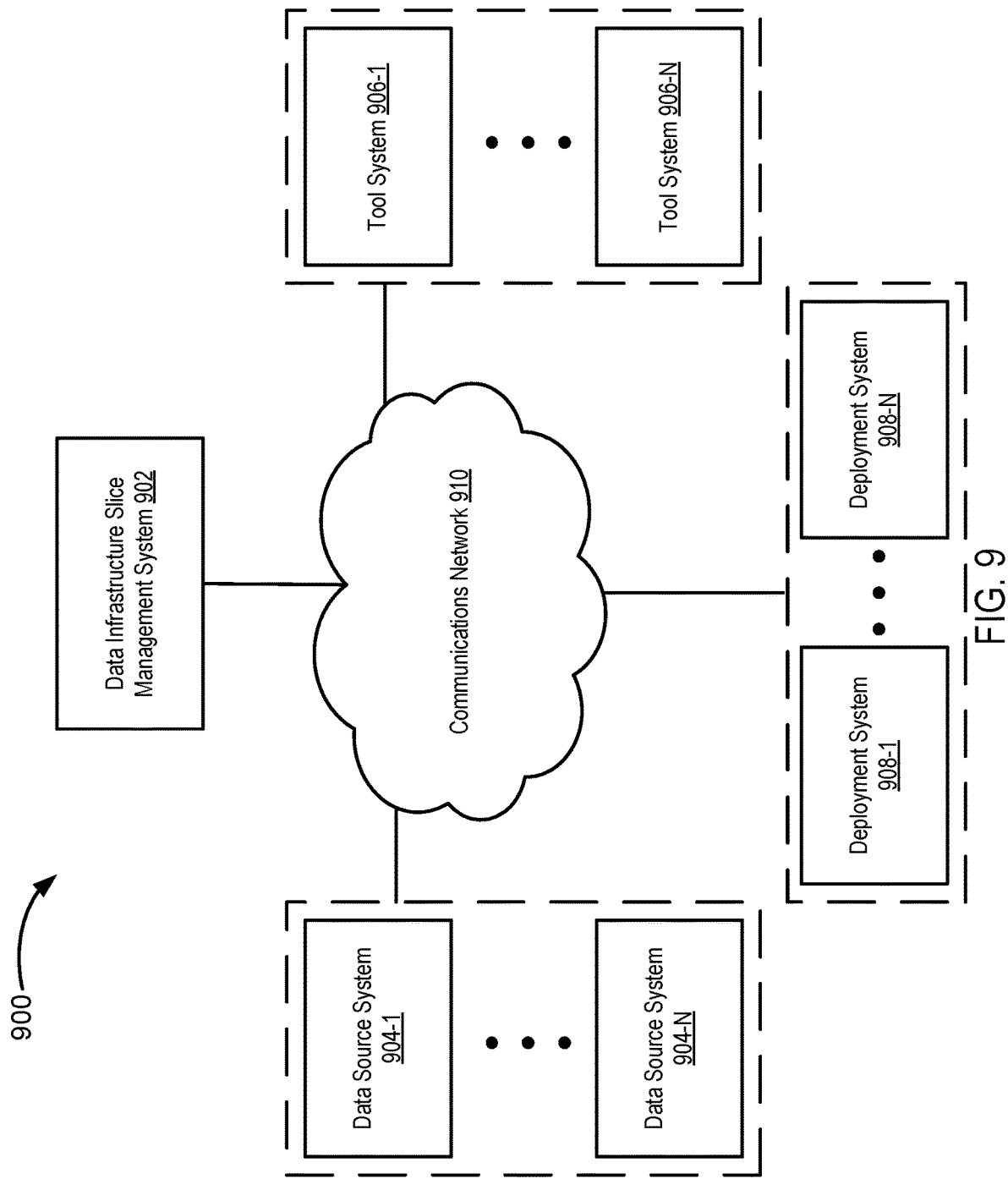
FIG. 9 depicts a diagram of an example system for generating, deploying, and managing data infrastructure stacks according to some embodiments.

FIG. 9 depicts a diagram 900 of an example system for generating, deploying, and managing data infrastructure stacks. In the example of FIG. 9, the system includes a data infrastructure slice management system 902, data source systems 904-1 to 904-N (individually, the data source system 904, collectively, the data source systems 904), tool systems 906-1 to 906-N (individually, the tool system 906, collectively, the tool systems 906), deployment systems 908-1 to 908-N (individually, the deployment system 908, collectively, the deployment systems 908), and a communication network 910.

The data infrastructure slice management system 902 may function to generate, store, and/or manage slices. In various embodiments, functionality of the data infrastructure slice management system 902 may be performed by one or more servers (e.g., a cloud-based server) and/or other computing devices. In some embodiments, a slice may include a service (e.g., microservice) and/or set of services. A service may include one or more functions. As used herein, a function may include an AWS Lambda function (e.g., a predefined AWS Lambda functions, or a function provided to AWS Lambda for execution thereon), or other type of function capable of execution in a cloud-computing environment. Functions may be "serverless" native (e.g., comprised entirely of serverless code, or comprised partially of serverless code).

In some embodiments, slices may include one or more interfaces (e.g., APIs) for communicating with other slices and/or one or more systems (e.g., data source systems, tool systems). For example, a particular slice may include one or more interfaces for communicating with a data source system to obtain original data, and for communicating with another slice for organizing and/or transforming data. The interfaces may be implemented using a custom domain-specific programming language.

In some embodiments, a collect slice may function to gather data from a particular type of data source (e.g., Postgres database) and transform the data into a specific format (e.g., an S3 format), an organize slice may function to organize (e.g., store, transform) the data into a particular format (e.g., Redshift format), and a harness slice may function to harness one or more tool systems (e.g., analytics and/or reporting tool systems) for processing data (e.g., organized and/or transformed data). In some embodiments, slices may be isolated from each other, even within a particular data infrastructure stack. Some or all slices may include one or more atomic services.

In some embodiments, the data infrastructure slice management system 902 may function to generate and/or deploy data infrastructure stacks from previously created, and/or previously defined, slices. For example, a data infrastructure stack may include predefined slices for collecting data, organizing data, and harnessing tools for processing and/or otherwise acting on data (collectively, "acting on data"). For example, acting on data may include querying data, analyzing data, generating reports on data, and so forth. Acting on data may include generating tool data (e.g., data output by a tool system). As used herein, tool data may be treated the same or different as original data. For example, collect slices may perform similar functionality with respect to tool data as original data.

In some embodiments, since slices are predefined and are deployment-target agnostic, data infrastructure stacks may be rapidly generated and/or deployed. For example, if different client entities have the same or similar requirements (e.g., collecting data from Salesforce, storing and/or organizing data in S3 and Redshift, and harnessing JupyterHub), the same data infrastructure stack may be deployed to each of the different client entity deployment systems (e.g., within respective AWS accounts) and achieve the same and/or similar functionality, albeit with different data sets and/or client entity permissions. Similarly, if different client entities have some requirements that are the same or similar, and other requirements that are different, the same portion of the data infrastructure stack (e.g., one or more particular slices) corresponding to the same or similar requirements may be deployed to each of the different client entity deployment systems (e.g., as a portion of a respective data infrastructure stack) and achieve the same and/or similar functionality, albeit with different data sets and/or client entity permissions. For example, a set of slices may be defined and utilized in a data infrastructure stack of one entity and a subset of the same slices may be utilized in a data infrastructure stack (e.g., with other pre-defined or new slices) of another entity.

The data source systems 904 may function to store original data and provide original data to one or more other systems. The data source systems 904 may store different types of original data, such as original data having different data formats. Data formats may refer to data types, file formats, content formats, schemas, and/or the like. In some embodiments, a schema refers to the organization of data as a map of how a datastore is constructed (e.g., divided into database tables in the example of a relational database). A schema may define a set of formulas (e.g., integrity constraints) imposed on a datastore. Integrity constraints may ensure compatibility between various parts of the schema. All constraints may be expressed in the same language. In various embodiments, functionality of the data source system 904 may be performed by one or more servers (e.g., a cloud-based server) and/or other computing devices.

In some embodiments, the data source systems 904 may include various database systems (e.g., Postgres, MySQL), data services (e.g., Sensortower, Second Measure) and/or various platforms that store and/or provide data (e.g., Facebook, Crunchbase, Salesforce). Original data may be stored and/or accessed using different data formats and/or APIs. For example, original data may include transaction data, customer relationship management (CRM) data, and/or the like each of which may be stored by a different data source system 904. Although FIG. 9 depicts each data source system 904 in a box, any or all may be independent of each other. The same may also be true for tool systems 906 and/or deployment systems 908.

In some embodiments, data may be pulled from the data sources systems 904 by a deployed data infrastructure stack, or portion thereof (e.g., by one or more sources in the cloud). Data source systems 904 may include systems that are internal and/or external with respect to a third-party entity. For example, an internal data source system 904 may include a system operated and/or controlled by a particular client entity, and an external data source system 904 may include a system that is not operated and/or controlled by the particular client entity.

The tool systems 906 may function to perform various analysis and/or reporting functions. In some embodiments, functionality of the tool systems 906 may be performed by one or more servers (e.g., cloud-based servers) and/or other computing devices. For example, the tool systems 906 may include JupyterHub, Metabase, EMR, and/or the like. The tool systems 906 may be triggered by a deployed data infrastructure stack, or portion thereof (e.g., one or more harness slices).

The deployment systems 908 may each function to execute a data infrastructure stack deployed therein. In various embodiments, functionality of the deployment systems 908 may be performed by one or more servers (e.g., a cloud-based server) and/or other computing devices. In some embodiments, the deployment systems 908 may be implemented by a cloud-computing platform. As used herein, a cloud-computing platform may refer to an on-demand cloud-computing platform (e.g., AWS) and/or "serverless" cloud-computing platform (e.g., AWS Lambda). Each of the deployment systems 908 may be associated with a corresponding client entity account of the cloud-computing platform. This may allow, for example, data infrastructures stacks to be scalable, as well as extensible. It will be appreciated that a "serverless" cloud-computing platform may dynamically manage allocation of computing resources. Accordingly, "serverless" computing may still require servers.

In operation, a deployment system 908 may function to execute corresponding portions of a data infrastructure stack on-demand in order to collect data, organize data, and harness tools for acting on data. A particular collect slice (e.g., an event slice), or group of collect slices, may trigger a data pull from one or more data source systems 904. For example, an event slice may periodically trigger a scheduler function (e.g., every 5 minutes). The scheduler function may determine which collect slices and/or collect functions to trigger. If there are different types of data within a particular data source 904, multiple corresponding slices and/or functions may be triggered. The slices and/or functions may connect to the data source system 904, pull the original data, transform the original data, and store the original and transformed data to a datastore (e.g., an S3 datastore of the deployment system 908) in an appropriate directory location. In some embodiments, whenever new data is written to the datastore directory location, the system generates an event which triggers a loader function (e.g., a Redshift loader function) of an organize slice of the data infrastructure stack. The organize slice may execute the Redshift loader function and execute a command (e.g., a copy command) to load the data to another data store (e.g., a Redshift datastore of the deployment system 908).

In some embodiments, data from different data source systems 904, and/or data having different data formats within the same or different data source systems 904, may be pulled at different times (e.g., based on different schedules). One or more scheduler functions may pull data based the data source system 904, data format, and/or the like. For example, transaction data may be pulled every 5 minutes, and CRM data may be pulled every 20 minutes.

The communications network 910 may represent one or more computer networks (e.g., LAN, WAN, or the like) or other transmission mediums. The communication network 910 may provide communication between systems 902-908 and/or other systems described herein. In some embodiments, the communication network 910 includes one or more computing devices, routers, cables, buses, and/or other network topologies (e.g., mesh, and the like). In some embodiments, the communication network 910 may be wired and/or wireless. In various embodiments, the communication network 910 may include the Internet, one or more wide area networks (WANs) or local area networks (LANs), one or more networks that may be public, private, IP-based, non-IP based, and so forth.

Figure 10:
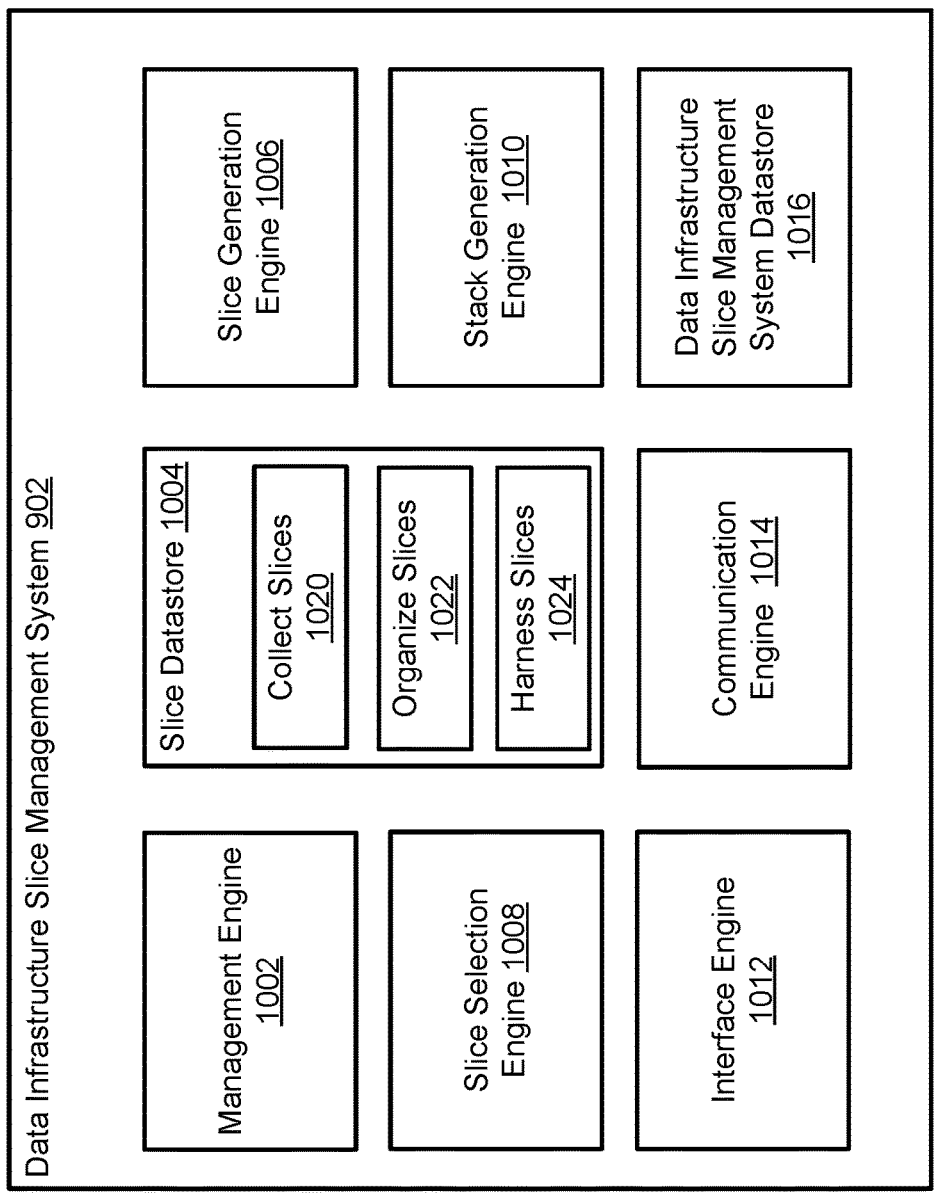
FIG. 10 depicts a diagram of an example of a data infrastructure slice management system according to some embodiments.

FIG. 10 depicts a diagram 1000 of an example of a data infrastructure slice management system 902 according to some embodiments. In the example of the FIG. 10, the data infrastructure slice management system 902 includes a management engine 1002, a slice datastore 1004, a slice generation engine 1006, a slice selection engine 1008, a stack generation engine 1010, an interface engine 1012, a communication engine 1014, and a data infrastructure slice management system datastore 1016.

The management engine 1002 may function to manage (e.g., create, read, update, delete, or otherwise access) slices (e.g., collect slices 1020, organize slices 1022, harness slices 1024) stored in the slice datastore 1004. The management engine 1002 may perform any of these operations manually (e.g., by a user interacting with a GUI) and/or automatically (e.g., triggered by one or more of the engines 1006-1014, discussed herein). In some embodiments, the management engine 1002 includes a library of executable instructions, which are executable by one or more processors for performing any of the aforementioned management operations. Like other engines described herein, functionality of the management engine 1002 may be included in one or more other engines (e.g., engines 1006-1014).

The collect slices 1020 may include one or more functions, attributes, and/or parameters for collecting and/or transforming data. For example, collect slices 1020 may fetch original data from internal and/or external data source systems, tools systems, and/or the like. The collect slices may transform the original data and/or store that original data and/or transformed data. Transforming may include converting original data having one or more particular data formats (e.g., Postgres) to transformed data having one or more other data formats (e.g., S3), and/or converting transformed data having one or more different data formats (e.g., S3) to transformed data having one or more different data formats (e.g., Redshift). In some embodiments, the collect slices 1020 may transform original data, and store the original data and the transformed data in an S3 bucket directory structure. The original data may be transformed in order to make it loadable for a particular format (e.g., S3, Redshift).

In some embodiments, a collect slice 1020 includes a function. The function may take static and/or dynamic input parameters. Static input parameters may include connection strings and/or credentials to connect to the corresponding data source system to pull, and/or otherwise obtain, data. Dynamic input parameters may be used for advanced features (e.g., pagination, fanout).

In various embodiments, the static input parameters do not change between different invocations of the collect slice 1020. The static input parameters may be inserted when deploying the collect slice 1020 (e.g., into a datastore associated with the corresponding deployment system). The static input parameters may be manually and/or automatically entered. In some embodiments, static input parameters may be inferred from the data source system itself. For example, a bootstrap process may be executed as part of the deployment. The bootstrap process may execute in a separate function as part of secure operation mode.

In some embodiments, particular collect slices may include event slices. Event slices may trigger other collect slices 1020 to obtain data. For example, an event slice may include a scheduler function to obtain data at predetermined intervals. The event slices may also update and/or refresh data. For example, the event slices may function to cause a particular collect slice 1020 to obtain original data from a data source system every hour.

In some embodiments, a collect slice 1020 may include some or all of the following:
  Collect Slice ID: identifies the collect slice
  Function(s): one or more functions (e.g., microservices) of the collect slice
  Input Parameters
  Computing Resources: computing resources, and/or identifiers thereof, associated with the collect slice (e.g., S3, Redshift)
  Description: description of the collect slice—this may be searchable.

In some embodiments, an organize slice 1022 includes one or more functions, attributes and/or parameters for organizing data that may be harnessed. For example, an organize slice 1022 may include some or all of the following:
  Organize Slice ID: identifies the organize slice
  Function(s): one or more functions of the organize slice
  Format(s): Data format(s) associated with the organize slice. For example, a Redshift schema
  Computing Resource(s): computing resource(s) associated with the organize slice (e.g., S3, Redshift)
  Description: description of the organize slice. This may be searchable.

In some embodiments, a harness slice 1024 includes one or more functions, attributes and/or parameters for harnessing tools for acting on data (e.g., organized data). In some embodiments, a harness slice 1024 may include or incorporate services provided by one or more third-party systems (e.g., tool systems 906). It will be appreciated that a harness slice 1024, in some embodiments, may include calls (e.g., API calls) to services and/or code provided by third-party systems. For example, a harness slice 1024 may include the JupyterHub code itself and/or calls to a JupyterHub service provided by a third-party system. Similarly, in some embodiments, the harness slice 1024 may include and/or incorporate services provided by any party (e.g., even the creator or user of the harness slice 1024). It will be appreciated that a harness slice 1024, in some embodiments, may include calls (e.g., API calls) to services and/or code provided by any such party.

For example, a harness slice 1024 may include some or all of the following:
  Harness Slice ID: identifies the harness slice
  Function(s): one or more functions of the harness slice. For example, the one or more functions may be included in the harness slice and/or trigger one or more associated tool systems. In some embodiments, one or more tools systems may be implemented within the harness slice.
  Resource(s): one or more computing resources of the harness slice. For example, the one or more resources (e.g., a database) may be included in the harness slice and/or otherwise accessed (e.g., via API calls) by the harness slice.
  Format: Required data format for harnessing (e.g., Redshift)
  Description: description of the harness slice—this may be searchable.

The slice generation engine 1006 may function to generate (e.g., create, read, update, delete) collect slices 1020, organize slices 1022, and/or harness slices 1024. The slice generation engine 1006 may generate slices 1020-1024 based on predefined functions, and/or the slice generation engine 1006 may define new functions (e.g., responsive to user input) and generate slices 1020-1024 from the new functions. Slices 1020-1024 may be generated to include some or all of the corresponding information described above. In some embodiments, slices 1020-1024 may be generated using a custom domain-specific programming language, which may allow, for example, the slice generation engine 1006 to efficiently and/or accurately generate slices 1020-1024 that are compatible with each other and/or various deployment targets.

The slice selection engine 1008 may function to select one or more slices 1020-224 for a data infrastructure stack. In some embodiments, the slice selection engine 1008 may select one or more slices 1020-1024 based on user input and/or specification requirements (e.g., obtained from a specification requirements data message). For example, the user input may include slice identifiers. Specification requirements may include the types of associates data source systems, data formats, tool systems, and/or the like. For example, the specification requirements may indicate data is to be pulled from Postgres databases, stored in S3 and Redshift, and harnessed by JupyterHub.

The stack generation engine 1010 may function to generate the data infrastructure stack. In some embodiments, a data infrastructure stack may include a set of one or more collect slices 1020, one or more organize slices 1022, and one or more harness slices 1024. The stack generation engine 1010 may generate the data infrastructure stack in response to a completed selection of slices. In some embodiments, a data infrastructure stack may refer to a particular set of slices, and a data infrastructure stack instance (or, "deployment") may refer to a particular deployed data infrastructure stack and associated data.

In some embodiments, some or all of the functionality of the stack generation engine 1010 may be performed by one or more other systems (e.g., deployment systems 908). For example, the slice management system 902 may provide selected slices to a deployment system 908, and the deployment system 908 may generate the data infrastructure stack from the selected slices (e.g., within a customer's AWS account).

The interface engine 1012 may function to receive input, present information, and provide information. For example, the deployment interface engine 1012 may receive input for generating slices (e.g., slice definitions), receive input for selecting slices (e.g., specification requirements, slice descriptions, and/or slice identifiers), present a user interface (e.g., a GUI) for receiving input and presenting information (e.g., a graphical user interface for generating, selecting, and/or otherwise providing information regarding the slices), and provide data infrastructure stacks (e.g., to a deployment system 908).

In some embodiments, the interface engine 1012 functions to facilitate management of deployed data infrastructure stacks. For example, the interface engine 1012 may allow an administrator to manage a data infrastructure stack using client entity encryption keys based on one or more cross-account rules. For example, the cross-account rules may define access permissions set by the client entity, thereby ensuring control of the deployed data infrastructure stack remains with the client entity.

The communication engine 1014 may function to send requests, transmit and, receive communications, and/or otherwise provide communication with one or a plurality of systems. In some embodiments, the communication engine 1014 functions to encrypt and decrypt communications. The communication engine 1014 may function to send requests to and receive data from a system (e.g., data sources systems 904, tools systems 906, deployment systems 908) through a network or a portion of a network. Depending upon implementation-specific considerations, the communication engine 1014 may send requests and receive data through a connection, all or a portion of which may be a wireless connection. The communication engine 1014 may request and receive messages, and/or other communications from associated systems. Communications may be stored in the data infrastructure slice management system 1016.

Figure 11:
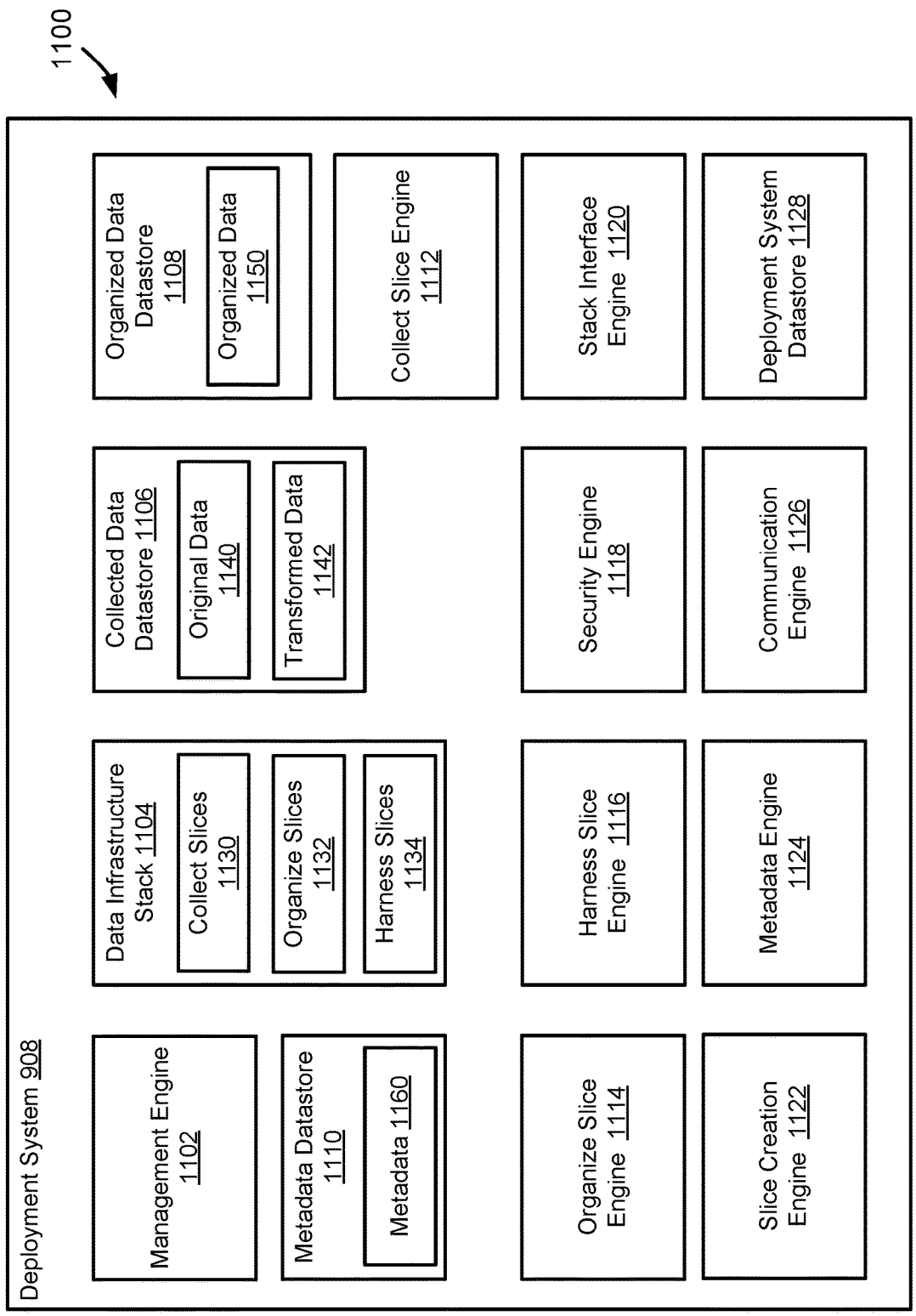
FIG. 11 depicts a diagram of an example of a deployment system according to some embodiments.

FIG. 11 depicts a diagram 1100 of an example of a deployment system 908 according to some embodiments. In the example of FIG. 11, the deployment system 908 includes a management engine 1102, a data infrastructure stack 1104, a collected data datastore 1106, an organized data datastore 1108, a metadata datastore 1110, a collect slice engine 1112, an organize slice engine 1114, a harness slice engine 1116, a security engine 1118, a data infrastructure stack interface engine 1120, a slice creation engine 1122, a metadata engine 1124, a communication engine 1126, and a deployment system datastore 1128.

The management engine 1102 may function to manage (e.g., create, read, update, delete, or otherwise access) slices (e.g., collect slices 1130, organize slices 1132, harness slices 1134) of the data infrastructure stack 1104, original data 1140 and transformed data 1142 of the collected data datastore 1106, organized data 1150 of the organized data datastore 1108), and/or the metadata 1160 of the metadata datastore 1110. The management engine 1102 may perform any of these operations manually (e.g., by a user interacting with a GUI) and/or automatically (e.g., triggered by one or more of the engines 1112-1126, discussed herein). In some embodiments, the management engine 1002 includes a library of executable instructions, which are executable by one or more processors for performing any of the aforementioned management operations. Like other engines described herein, functionality of the management engine 1102 may be included in one or more other engines (e.g., engines 1112-1126).

The data infrastructure stack 1104 may include a set of selected collect slices 1130, organize slices 1132, and harness slices 1134. In some embodiments, the data infrastructure stack 1104 may also include other functionality, resources, and/or data. For example, the data infrastructure stack 1104 may include the functionality, resources, and/or data of some or all of the engines 1102 and 1112-1116, and/or the datastores 1106-1110.

The original data 1140 may include data formatted according to an origin data format (e.g., a schema associated with a data source system 904). In some examples, original data may include tabular schema formatted data, object-oriented schema formatted data, and/or the like. For example, original data may include data retrieved from database systems, data services, and/or the like. In some embodiments, the original data 1140 may mirror original data of the originating system. In order to maintain an update-to-date mirror, the original data 1140 may refreshed periodically. As described elsewhere herein, tool data may be treated the same or similarly as original data.

The transformed data 1142 may comprise data that has been transformed any number of times. For example, the transformed data 1142 may include original data 1140 that has been transformed to a particular target format (e.g., S3, Redshift). Similarly, the transformed data may include previously transformed data that has been subsequently transformed (e.g., original data that is transformed to an S3 data format and subsequently transformed to a Redshift data format). In some embodiments, transformed data 1142 includes original data 1140 that has been transformed to a specific data format (e.g., S3), which may allow, for example, original data 1140 to be obtained from disparate data source systems and maintained in a datastore with a specific format (e.g., S3).

The organized data 1150 may include transformed data organized and/or managed according to a particular data format (e.g., one or more Redshift data formats). In some embodiments, the organized data may be organized and/or managed for harnessing by a particular set of harness slices 1024 or tools. For example, the organized data datastore 1108 may include a managed Redshift datastore, and the organized data 1150 may include Redshift formatted data.

The metadata 1160 may include metadata associated with any of the data infrastructure stack 1104, slices 1130-1134, and data 1140-1150. For example, metadata 1160 may identify a source of data, format of data, provenance of data, target for data (e.g., a particular tool system), time information (e.g., timestamps when data was obtained, stored, harnessed), and/or the like. In some embodiments, like the other data described herein, the metadata 1160 may be stored in a distinct data store (e.g., in metadata datastore 1110, as shown), and/or it may be stored elsewhere (e.g., within the data infrastructure stack 1104 itself).

The collect slice engine 1112 may function to trigger and/or execute collect slices 1130. For example, the collect slices engine 1112 may obtain original data 1140, store original data 1140, transform original data 1140 into transformed data 1142, store transformed data 1142, and/or the like. The collect slice engine 1112 may implement the functionality of the executed collect slice 1130, and/or the collect slice engine 1112 may be implemented within the collect slice 1130 of the data infrastructure stack 1104. The collect slice engine 1112 may function to execute a set of collect slices 1130 (e.g., serially and/or in parallel).

The organize slice engine 1114 may function to trigger and/or execute organize slices 1132. For example, the organize slices engine 1114 may obtain and/or load original data 1140 and/or transformed data 1142, transform/organize original data 1140 and/or transformed data 1142 into organized data 1150, store organized data 1142, and/or the like. The organize slice engine 1114 may implement the functionality of the executed organize slices 1132, and/or the functionality of organize slice engine 1114 may be implemented within the organize slices 1132 of the data infrastructure stack 1104. The organize slice engine 1114 may function to execute a set of organize slices 1132 (e.g., serially and/or in parallel).

The harness slice engine 1116 may function to trigger and/or execute harness slices 1134. For example, the harness slices engine 1116 may trigger one or more tool systems to act on organized data 1150. The harness slice engine 1116 may implement the functionality of the executed harness slices 1134, and/or the functionality of harness slice engine 1116 may be implemented within the harness slices 1134 of the data infrastructure stack 1104. The harness slice engine 1116 may function to execute a set of harness slices 1134 (e.g., serially and/or in parallel).

The security engine 1118 may function to encrypt/decrypt data, define and/or enforce permissions, and/or the like. For example, the security engine 1118 may encrypt/decrypt data associated with the data infrastructure stack 1104 using a set of keys controlled by an associated third-party entity (e.g., the third-party entity associated with the deployment system 908). In some embodiments, the security engine 1118 may define and/or execute cross-account permission rules. For example, cross-account permission rules may allow the third-party entity to grant permission for another system (e.g., data infrastructure slice management system 902) to manage some or all of the features of the deployment system 908 and/or data infrastructure stack 1104.

In some embodiments, the security engine 1118 may anonymize data in order for other systems (e.g., data infrastructure stack slice management system 902) to effectively manage the deployment system 908 and/or data infrastructure stack 1104 without accessing the real underlying data. A security engine of the deployment system 908 may anonymize the data on a per session basis, rather than storing a single set of anonymized data. This may help reduce, for example, a likelihood that the underlying data may be "reverse-engineered" or otherwise determined.

The data infrastructure stack interface engine 1120 may function to obtain data infrastructure stacks and/or slices (e.g., from data infrastructure slice management system 902). For example, the data infrastructure stack interface engine 1120 may receive new data infrastructure stacks, updates to particular slices, new slices, and/or the like.

The slice creation engine 1122 may function to create, update, delete, and/or otherwise modify slices 1130-1134 of the data infrastructure stack 1104. This may allow the associated third-party entity to maintain the data infrastructure stack 1104 without requiring additional supporting systems and/or services. In some embodiments, the slice creation engine 1122 may cooperate with the data infrastructure slice management system 902 and/or portion thereof (e.g., slice generation engine 1006) to create, update, delete, and/or otherwise modify slices 1130-1134.

The metadata engine 1124 may function to define, gather, assign and/or analyze metadata 1160. For example, the metadata engine 1124 may analyze metadata 1160 to determine data provenance, and facilitate harnessing of organized data 1150 by harness slices 1134.

The communication engine 1126 may function to send requests, transmit and, receive communications, and/or otherwise provide communication with one or a plurality of systems. In some embodiments, the communication engine 1126 functions to encrypt and decrypt communications. The communication engine 1126 may function to send requests to and receive data from a system (e.g., data infrastructure stack slice management engine 902, data source systems 904, tool systems 906) through a network or a portion of a network. Depending upon implementation-specific considerations, the communication engine 1126 may send requests and receive data through a connection, all or a portion of which may be a wireless connection. The communication engine 1126 may request and receive messages, and/or other communications from associated systems. Communications may be stored in the deployment system 1128.

Figure 12:
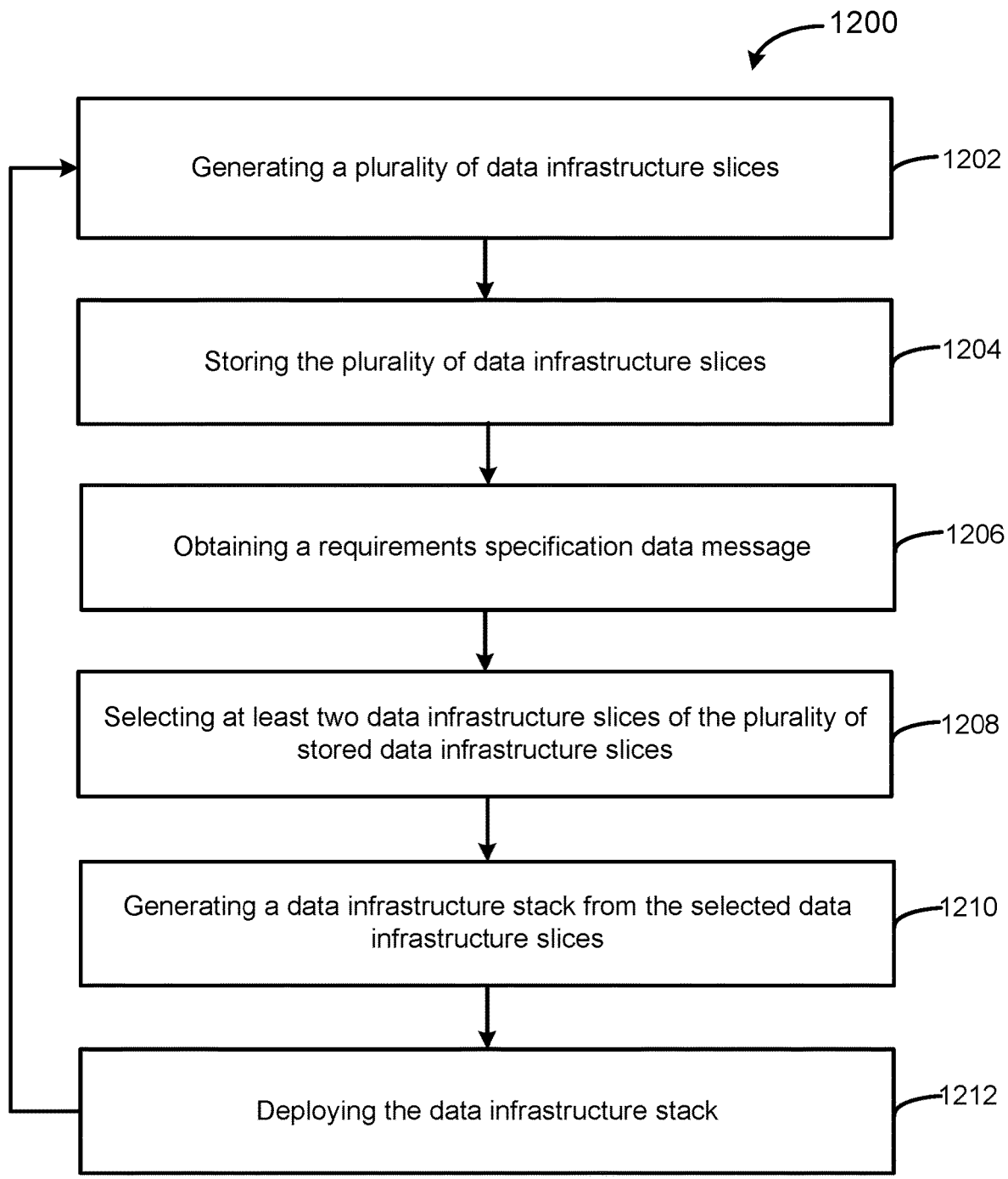
FIG. 12 depicts a flowchart of an example of a method of generating and deploying a data infrastructure stack using a plurality of predefined data infrastructure slices according to some embodiments.

FIG. 12 depicts a flowchart 1200 of an example of a method of generating and deploying a data infrastructure stack using a plurality of predefined data infrastructure slices according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 1202, a data infrastructure slice management system (e.g., data infrastructure slice management system 902) generates a plurality of data infrastructure slices (e.g., slices 1020-1024). Each of the plurality of data infrastructure slices may include a respective service. At least a portion of the respective services may include respective microservices. Each of the plurality of data infrastructure slices may be capable of providing communication with one or more of the other data infrastructure slices of the plurality of data infrastructure slices. For example, a collect slice (e.g., collect slices 1020 or 1130) may be capable of communicating with an organize slice (e.g., organize slice 1022 or 1132) and/or vice versa; an organize slice may be capable of communicating with a harness slice (e.g., harness slice 1024 or 1134) and/or vice versa. In some embodiments, the communication may be enabled by a custom domain-specific programming language used to generate the slices. In some embodiments a slice generation engine (e.g., slice generation engine 1006) generates the slices.

In step 1204, the data infrastructure slice management system stores the plurality of data infrastructure slices. In some embodiments, a slice datastore (e.g., slice datastore 1004) stores the data infrastructure slices.

In step 1206, the data infrastructure slice management system obtains one or more requirements specification data messages. For example, the one or more specification requirements data message may include specification requirements, such as the types of associated data source systems, data formats, tools, and/or the like. The specification requirements may indicate data is to be pulled from Postgres databases, stored in S3 and Redshift, and harnessed by JupyterHub.

In some embodiments, a communication engine (e.g., communication engine 1014) obtains the one or more requirements specification data messages over a communication network (e.g., communications network 202) from a client entity system (e.g., deployment system 908), and/or a slice selection engine (e.g., slice selection engine 1008) receives the one or more requirements specification data messages.

In step 1208, the data infrastructure slice management system selects at least two data infrastructure slices of the plurality of stored data infrastructure slices. For example, the data infrastructure slice management system may select one or more collect slices (e.g., collect slices 1020), one or more organize slices (e.g., organize slices 1022), and one or more harness slices (e.g., harness slices 1024). The selection may be based on the one or more requirements specification data messages. In some embodiments, a slice selection engine (e.g., slice selection engine 1008) performs the selection.

In some embodiments, selection may be based on the one or more requirements specification data messages and/or other factors. For example, other factors may include data sources, data formats, metadata, and/or the like.

In step 1210, the data infrastructure slice management system generates a data infrastructure stack (e.g., data infrastructure stack 1104) from the selected stored data infrastructure slices. The data infrastructure stack may be generated in response to the selection of step 1208. The data infrastructure stack may include the selected slices. The data infrastructure stack may be capable of being executed in different third-party entity accounts of one or more on-demand cloud-computing platform (e.g., different deployment systems 908). In some embodiments, a stack generation engine (e.g., stack generation engine 1010) generates the data infrastructure stack on the data infrastructure slice management system and/or remote system (e.g., deployment system 908).

In step 1212, the data infrastructure slice management system deploys the data infrastructure stack. The data infrastructure stack may be deployed in a particular third-party entity account of the on-demand cloud-computing platform. In some embodiments, the data infrastructure stack may be deployed in one or more different third-party entity accounts of one or more on-demand cloud-computing platforms. In some embodiments, an interface engine (e.g., interface engine 1012) deploys the data infrastructure stack over the communication network. Any of the steps 1202-1212 may be repeated in order to, for example, generate and/or deploy the same data infrastructure stack or a different data infrastructure stack to any number of deployment systems.

Figure 13:
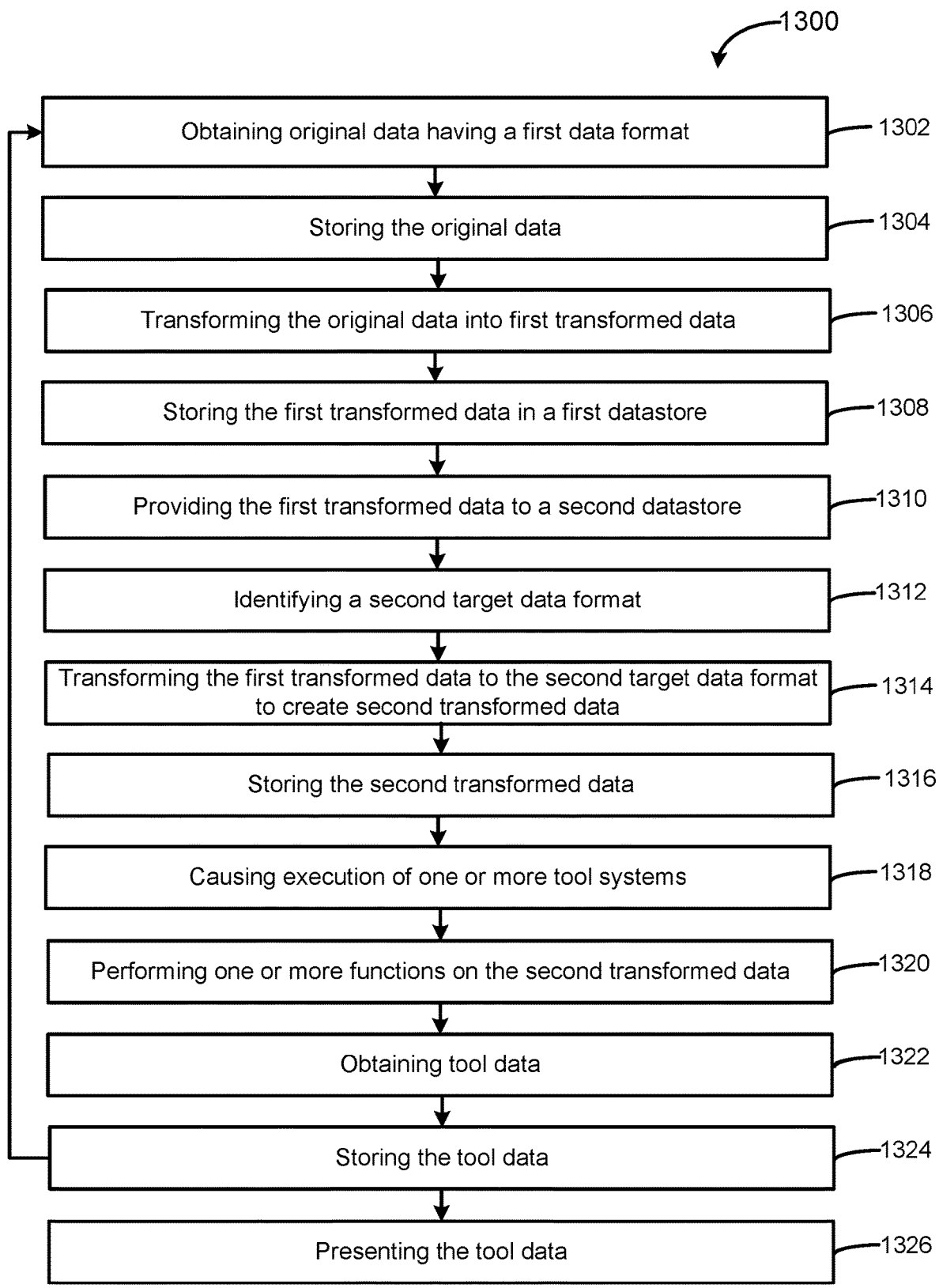
FIG. 13 depicts a flowchart of an example of a method of executing a data infrastructure stack using a plurality of predefined data infrastructure slices according to some embodiments.

FIG. 13 depicts a flowchart 1300 of an example of a method of executing a data infrastructure stack using a plurality of predefined data infrastructure slices according to some embodiments. In step 1302, a deployment system (e.g., deployment system 908) obtains original data (e.g., original data 1140) having a first data format (e.g., a Postgres tabular schema). The original data may be obtained from one or more data source systems (e.g., data source systems 904). For example, the original data may be obtained in response to a schedule function of a collect slice (e.g., a collect slice 1130) of a deployed data infrastructure stack (e.g., data infrastructure stack 1104). In some embodiments, a collect slice (e.g., a collect slice 1130) of the deployed data infrastructure stack obtains the original data over a communication network (e.g., communication network 202).

In step 1304, the deployment system stores the original data. In some embodiments, the deployment system stores the original data in a first data store (e.g., collected data datastore 1106). Like any of the data stores associated with the deployment system, the first datastore may be internal and/or external to a third-party entity associated with the deployment system. For example, the original data may be stored in an original schema, such as the schema of the data source systems. In some embodiments, a management engine (e.g., management engine 1102) stores the original data.

In step 1306, the deployment system transforms the original data into first transformed data. The deployment system may transform the original data from the first data format (e.g., an original data format) to a first target data format (e.g., an S3 and/or Redshift data format). In some embodiments, the collect slice engine and/or one or more collect slices transform the data.

In step 1308, the deployment system stores the first transformed data (e.g., transformed data 1142) in the first datastore. In some embodiments, the management engine and/or one of more collect slices store the transformed data. For example, the one or more collect slices may trigger the management engine to the stored the transformed data.

In step 1310, the deployment system provides the first transformed data to a second datastore (e.g., organized data datastore 1108). In some embodiments, the collect slices and/or collect slice engine provides the data.

In step 1312, the deployment system identifies a second target data format. In some embodiments, the second target data format may be identified based on a required format of one or more harness slices (e.g., harness 1034) and/or tool systems (e.g., tool systems 906). For example, if a current data format is S3, and the harness slices and/or tool systems require a Redshift format, the deployment system may identify the Redshift format. In some embodiments, an organize slice engine (e.g., organize slice engine 1014) and/or one or more organize slices (e.g., organize slices 1032) identifies the second target data format.

In step 1314, the deployment system transforms the first transformed data to the second target data format to create second transformed data. For example, the deployment system may transform S3 formatted data to a Redshift data format which may allow and/or support additional querying and/or harnessing than would otherwise be allowed by the prior format. In some embodiments, the organize slice engine and/or organize slices perform the transform.

In step 1316, the deployment system stores the second transformed data. For example, the deployment system may store the second transformed data in an organized (or, "managed") Redshift instance. In some embodiments, the organize slice engine and/or one or more organize slices store the data.

In step 1318, the deployment system causes execution of one or more tools systems. For example, one or more harness slices may trigger execution of one or more tools systems on the second transformed data. In some embodiments, the harness engine and/or one or more harness slices cause the execution.

In step, 1320, the one or more tool systems performs one or more functions on the second transformed data. For example, the one or more tool systems may analyze the second transformed data and generate a corresponding analytics report. The corresponding analytics report may be provided to a user (e.g., client entity, deployment system).

In step 1322, the deployment system obtains tool data (e.g., reports, analytics) from the execution of the one or more tools. In some embodiments, the collect engine and/or collect slices obtain the tool data.

In step 1324, the deployment system stores the tool data. In some embodiments, the collected data datastore stores the tool data, e.g., in an original and/or transformed data format.

In step 1326, the deployment system present at least a portion of the tool data. In some embodiments, a stack interface engine (e.g., stack interface engine 1120) presents the tool data. For example, a GUI may present the one or more corresponding analytics reports.

In various embodiments, original and/or transformed data may be refreshed (e.g., to ensure data does not become stale) by obtaining new original data (return to step 1302). For example, data may be refreshed based on a schedule (e.g., every 5 minutes, every hour) and/or in response to a trigger event (e.g., an event slice trigger).

Figure 23:
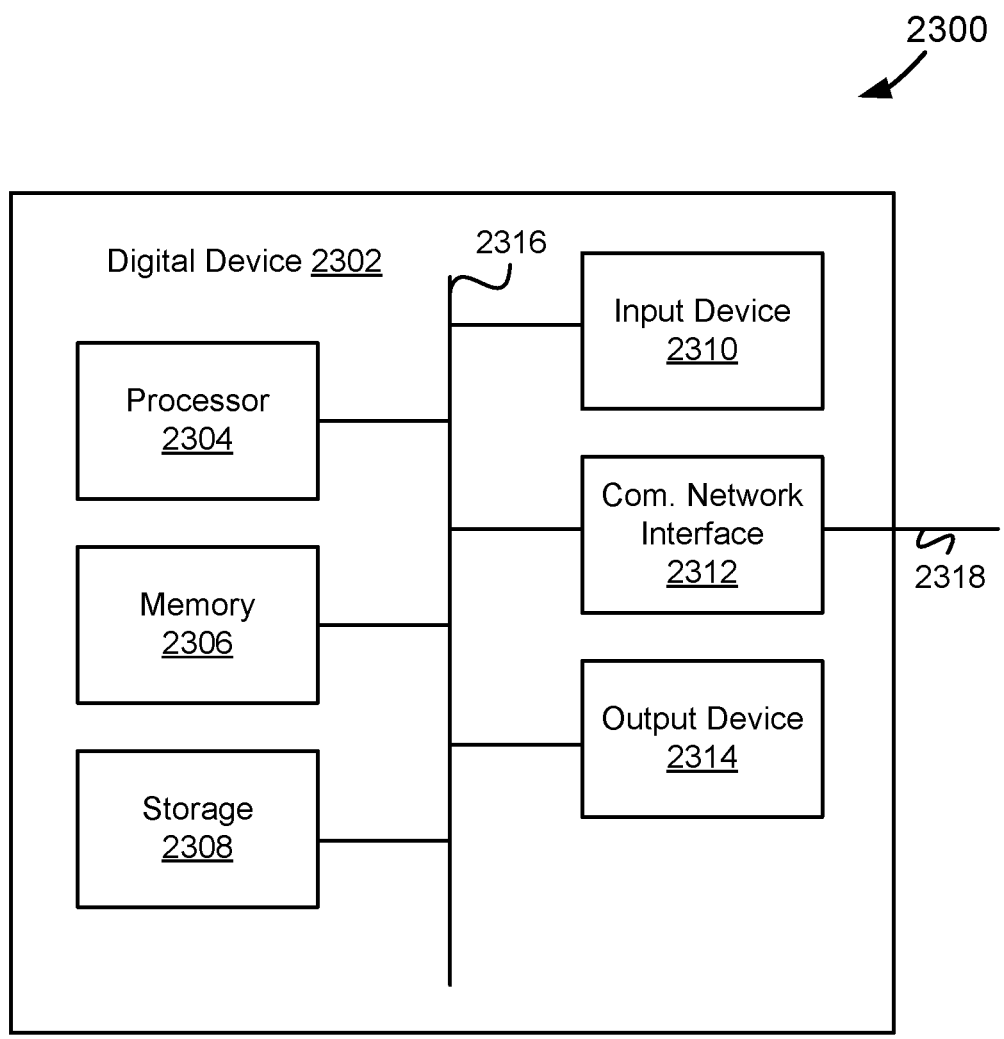
FIG. 23 is a diagram of an example computer system for implementing the features disclosed herein.

FIG. 23 depicts a diagram 2300 of an example of a computing device 2302. Any of the data infrastructure slice management system 902, the data source system 904, the tool system 906, the deployment system 906, and the communication network 202 may comprise an instance of one or more computing devices 2302. The computing device 2302 comprises a processor 2304, memory 2306, storage 2308, an input device 2310, a communication network interface 2312, and an output device 2314 communicatively coupled to a communication channel 2316. The processor 2304 is configured to execute executable instructions (e.g., programs). In some embodiments, the processor 2304 comprises circuitry or any processor capable of processing the executable instructions.

The memory 2306 stores data. Some examples of memory 2306 include storage devices, such as RAM, ROM, RAM cache, virtual memory, etc. In various embodiments, working data is stored within the memory 2306. The data within the memory 2306 may be cleared or ultimately transferred to the storage 2308.

The storage 2308 includes any storage configured to retrieve and store data. Some examples of the storage 2308 include flash drives, hard drives, optical drives, cloud storage, and/or magnetic tape. Each of the memory system 2306 and the storage system 2308 comprises a computer-readable medium, which stores instructions or programs executable by processor 2304.

The input device 2310 is any device that inputs data (e.g., mouse and keyboard). The output device 2314 outputs data (e.g., a speaker or display). It will be appreciated that the storage 2308, input device 2310, and output device 2314 may be optional. For example, the routers/switchers may comprise the processor 2304 and memory 2306 as well as a device to receive and output data (e.g., the communication network interface 2312 and/or the output device 2314).

The communication network interface 2312 may be coupled to a network (e.g., network 202) via the link 2318. The communication network interface 2312 may support communication over an Ethernet connection, a serial connection, a parallel connection, and/or an ATA connection.

The communication network interface 2312 may also support wireless communication (e.g., 802.11 a/b/g/n, WiMax, LTE, WiFi). It will be apparent that the communication network interface 2312 may support many wired and wireless standards.

It will be appreciated that the hardware elements of the computing device 2302 are not limited to those depicted in FIG. 23. A computing device 2302 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 2304 and/or a co-processor located on a GPU (i.e., NVidia).

Figure 14:
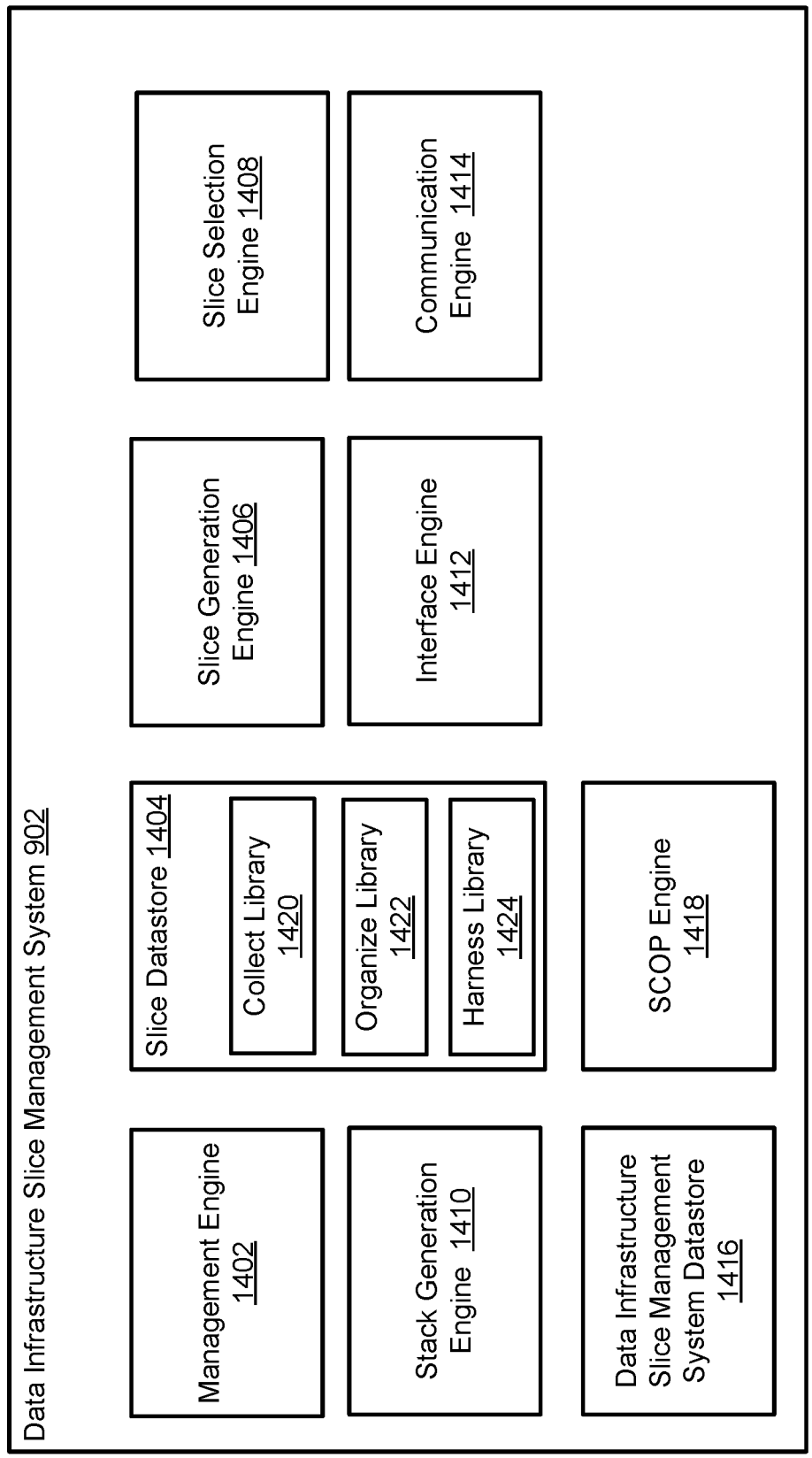
FIG. 14 depicts a diagram of an example system for stack control, orchestration and presentation (SCOP) system according to some embodiments.

FIG. 14 depicts a diagram of the DCOS system 204 according to some embodiments. The DCOS system 204 includes a management engine 1402, a slice datastore 1404, a slice generation engine 1406, a slice selection engine 1408, a stack generation engine 1410, an interface engine 1412, a communication engine 1414, a data infrastructure slice management system datastore 1416, a SCOP engine 1418, a collect slices engine, an organize slices engine 1422, and a harness slices engine 1424.

The management engine 1402 may function to manage (e.g., create, read, update, delete, or otherwise access) slices (e.g., collect slices, organize slices, harness slices) stored in the slice datastore 1404. The management engine 1402 may perform any of these operations manually (e.g., by a user interacting with a GUI) and/or automatically (e.g., triggered by one or more of the engines 1406-1414 and 1418, discussed herein). In some embodiments, the management engine 1402 includes a library of executable instructions, which are executable by one or more processors for performing any of the aforementioned management operations. Like other engines described herein, the functionality of the management engine 1002 may be included in one or more other engines (e.g., engines 1406-1414 and 1418).

Figure 15:
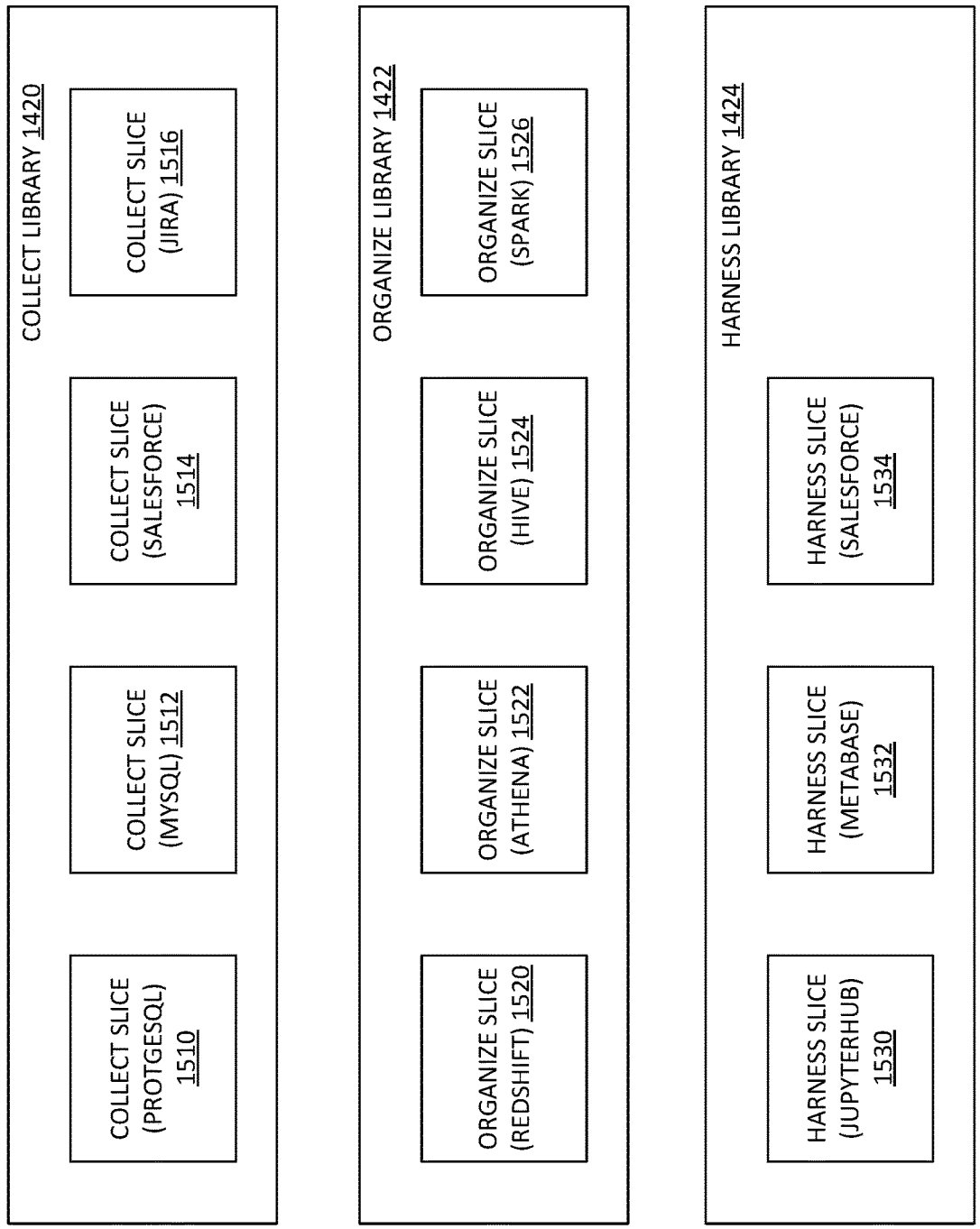
FIG. 15 depicts a diagram of further details of a collect slice library, an organize slice library, and a harness slice library according to some embodiments.

Collect slices, organize slices, and harness slices may be respectively stored in their associated libraries, such as a collect library 1420, an organize library 1422, and a harness library 1424. Further details of these libraries may be found in the description of FIG. 15. For example, the collect library 1420 includes different collection slices to collect data from different external data sources. The collect library 1420 may maintain one collect slice for each of the different types of data sources supported by the DCOS system 204, such as Postgres, MySQL, Salesforce, Facebook, and the like. For example, the collect library 1420 includes a collect slice 1510 to collect data from an open-source database such as PostgreSQL. The collect library 1420 may also include another collect slice 1512 to collect data from MySQL, a collect slice 1514 to collect data from a Salesforce database, and a collect slice 1516 to collect data from another data source such as Jira.

In some embodiments, the collect library 1420 is stored in the DCOS system 204. In various embodiments, the collect library 1420 may be stored a datastore associated with the first third-party system 808 and made available to some or all users associated with the first third-party system 808. In one embodiment, the collect library 1420 may be made available to designated users of certain third-party systems. In various embodiments, the collect library 1420 is available to a set of third-party systems.

The collect slices of the collect library 1420 may include one or more functions, attributes, and/or parameters for collecting and/or transforming data. For example, collect slices may fetch original data from internal and/or external data source systems, tools systems, and/or the like. The collect slices may transform the original data and/or store that original data and/or transformed data. Transforming may include converting original data having one or more particular data formats (e.g., Postgres) to transformed data having one or more other data formats (e.g., S3), and/or converting transformed data having one or more different data formats (e.g., S3) to transformed data having one or more different data formats (e.g., Redshift). In some embodiments, the collect slices may transform original data, and store the original data and the transformed data in an S3 bucket directory structure. The original data may be transformed in order to make it loadable for a particular format (e.g., S3, Redshift).

In some embodiments, a collect slice includes a function. The function may take static and/or dynamic input parameters. Static input parameters may include connection strings and/or credentials to connect to the corresponding data source system to pull, and/or otherwise obtain, data. Dynamic input parameters may be used for advanced features (e.g., pagination, fanout).

In various embodiments, the static input parameters do not change between different invocations of the collect slice of the collect library 1420. The static input parameters may be inserted when deploying the collect slice (e.g., into a datastore associated with the corresponding deployment system). The static input parameters may be manually and/or automatically entered. In some embodiments, static input parameters may be inferred from the data source system itself. For example, a bootstrap process may be executed as part of the deployment. The bootstrap process may execute in a separate function as part of secure operation mode.

In some embodiments, particular collect slices may include event slices. Event slices may trigger other collect slices of the collect library 1420 to obtain data. For example, an event slice may include a scheduler function to obtain data at predetermined intervals. The event slices may also update and/or refresh data. For example, the event slices may function to cause a particular collect slice to obtain original data from a data source system every hour.

In some embodiments, a collect slice of the collect library 1420 may include some or all of the following:
Collect Slice ID: identifies the collect slice
Function(s): one or more functions (e.g., microservices) of the collect slice
Input Parameters
Computing Resources: computing resources, and/or identifiers thereof, associated with the collect slice (e.g., S3, Redshift)
Description: description of the collect slice—this may be searchable.

In some embodiments, the organize library 1422 includes different organize slices to organize and/or analyze data. For example, the organize library 1422 may maintain one organize slice for each software application or program, supported by the DCOS system 204, to organize or analyze data such as RedShift, Athena, Hive, Apache Spark, and the like. For example, the organize library 1422 includes an organize slice 1520 to organize data so that it is compatible with Amazon Redshift. The organize library 1422 may also include another collect slice 1522 which organizes data into a format compatible with Athena. An organize slice 1524 may organize data to organize data into a data warehouse compatible with Apache Hive, and an organize slice 1526 to organize data or analyze data using software programs such as Apache Spark. One or more of the organize slices 1520-1526 of the organize library 1422 may analyze data using their respective software programs.

In some embodiments, the organize library 1422 is stored in the DCOS system 204. In various embodiments, the organize library 1422 may be stored a datastore associated with the first third-party system 808 and made available to some or all users associated with the first third-party system 808. In one embodiment, the organize library 1422 may be made available to designated users of certain third-party systems. In various embodiments, the organize library 1422 is available to a set of third-party systems.

In various embodiments, an organize slice of the organize library 1422 is configured to analyze and organize the output of the analysis into a table, spreadsheet, and the like. The format of the table or spreadsheet may depend on the software application used to analyze or organize the data. In some embodiments, the organize slice includes one or more functions, attributes, and/or parameters for organizing data that may be harnessed. In addition to the functional component of the organize slice, the organize slice of the organize library 1422 may include one or more format compatibility converters. An organize slice may include one or more format compatibility converter that allows the organize slice to organize or analyze data from a variety of data sources. For example, an organize slice may include some or all of the following:
Organize Slice ID: identifies the organize slice
Function(s): one or more functions of the organize slice
Format(s): Data format(s) associated with the organize slice. For example, a Redshift schema
Computing Resource(s): computing resource(s) associated with the organize slice (e.g., S3, Redshift)
Description: description of the organize slice. This may be searchable.

For example, the harness library 1424 includes different harness slices to collect data from different external data sources. The harness library 1424 may maintain one harness slice for each of the different harness tools supported by the DCOS system 204, such as JupyterHub, Metabase, Salesforce, and the like. For example, the harness library 1424 includes a harness slice 1530 to harness data to a data format that is compatible with JupyterHub. The harness library 1424 may also include another harness slice 1532 to harness data to a data format that is compatible with Metabase, and a harness slice 1534 to harness data to a data format that is compatible with Salesforce. One or more of the harness slices 1530-1534 of the harness library 1424 may harness data using their respective software programs.

In some embodiments, the harness library 1424 is stored in the DCOS system 204. In various embodiments, the harness library 1424 may be stored a datastore associated with the first third-party system 808 and made available to some or all users associated with the first third-party system 808. In one embodiment, the harness library 1424 may be made available to designated users of certain third-party systems. In various embodiments, the harness library 1424 is available to a set of third-party systems.

In some embodiments, a harness slice of the harness library 1424 includes one or more functions, attributes and/or parameters for harnessing tools for acting on data (e.g., organized data). In addition to the functional component of the harness slice, the harness slice of the harness library 1424 may include one or more format compatibility converters. A harness slice may include one or more format compatibility converter that allows the harness slice output or publish data into a variety of publication format. In some embodiments, a harness slice may include or incorporate services provided by one or more third-party systems (e.g., the first third-party system). It will be appreciated that a harness slice of the harness library 1424, in some embodiments, may include calls (e.g., API calls) to services and/or code provided by third-party systems. For example, a harness slice may include the JupyterHub code itself and/or calls to a JupyterHub service provided by a third-party system. Similarly, in some embodiments, the harness slice may include and/or incorporate services provided by any party (e.g., even the creator or user of the harness slice). It will be appreciated that a harness slice, in some embodiments, may include calls (e.g., API calls) to services and/or code provided by any such party.

For example, a harness slice may include some or all of the following:

Harness Slice ID: identifies the harness slice

Function(s): one or more functions of the harness slice. For example, one or more functions may be included in the harness slice and/or trigger one or more associated tool systems. In some embodiments, one or more tools systems may be implemented within the harness slice.

Resource(s): one or more computing resources of the harness slice. For example, the one or more resources (e.g., a database) may be included in the harness slice and/or otherwise accessed (e.g., via API calls) by the harness slice.

Format: Required data format for harnessing (e.g., Redshift)

Description: description of the harness slice—this may be searchable.

Figure 16:
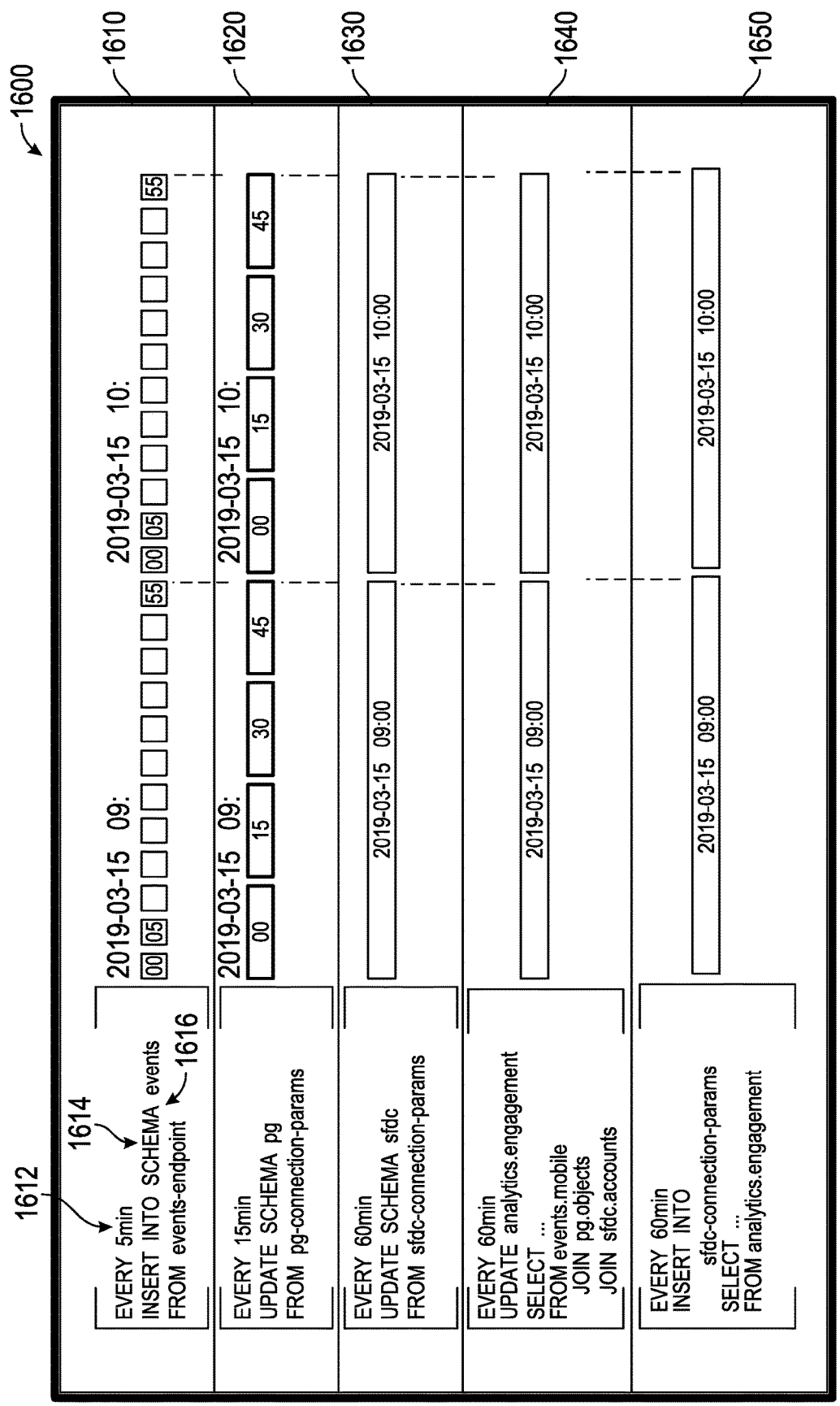
FIG. 16 depicts an example user interface for the SCOP system according to some embodiments.

The slice generation engine 1406 may function to generate (e.g., create, read, update, delete) collect slices, organize slices, and/or harness slices. Slices may be generated to include some or all of the corresponding information described above. In some embodiments, slices of the libraries 1420-1424 may be generated using a custom domain-specific programming language, which may allow, for example, the slice generation engine 1406 to efficiently and/or accurately generate slices that are compatible with each other and/or various deployment targets. The slice generation engine 1406 may generate slices based on predefined functions, and/or the slice generation engine 1406 may define new functions (e.g., responsive to user input) and generate slices from the new functions. For example, the slice generation engine 1406 may create a collect slice in response to a user input as seen in FIG. 16. The user may generate a SQL call by interacting with a user interface and inputting a frequency of the SQL call in field 1612, a destination for the collected data in field 1614, and specifying a first data source in field 1616. The DCOS system 204 may receive this input from the user, the management engine 1402 may send a request to the slice selection engine 1408 to select the collect slice from the data infrastructure slice management system datastore 1416. In some embodiments, if the management engine 1402 determines that the first collect slice corresponding to the user input is not in the data infrastructure slice management system datastore 1416, the management engine 1402 sends a request to the slice generation engine 1406 to generate a collect slice which corresponds to the user input.

The slice selection engine 1408 may function to select one or more slices from the collect library 1420, the organize library 1422, and/or the harness library 1424 for a data infrastructure stack. In some embodiments, the slice selection engine 1408 may select one or more slices based on user input and/or specification requirements (e.g., obtained from a specification requirements data message). For example, the user input may include slice identifiers. Specification requirements may include the types of associates data source systems, data formats, tool systems, and/or the like.

In a simplified example, the slice selection engine 1408 may select a collect slice capable of collecting data from an SQL database to store the collected data into a data lake or a data warehouse. The SQL database organizes data in a row-orientated database, and include data that is time-stamped in one date format, such as YYYY-MM-DD. The selection engine 1408 may select the organize slice capable of running analysis required based on user input and require input data to be organized in a column-orientated data and include data that is time-stamped in another date format, such as MM-DD-YYYY. The slice selection engine 1408 may include an intermediate slice which converts the row-orientated database to the column-orientated database and convert timestamp from one date format to another date format. In various embodiments, the selection engine may select an organize slice capable of receiving as an input an SQL table, converting the SQL table, which includes data that is time-stamped in one date format and convert the data to a column-orientated database and convert the time stamp to another time-stamp format.

In some embodiments, one collect slice converts the collected data into multiple file formats. For example, the collect slice collects data from an SQL database, and stores the collected data in multiple file formats, such as a row-orientated database or a column-orientated database, and particular file headers or footers required. In another example, the collect slice converts and stores the collected data into multiple data formats, such as the format of the date for each entry of data, the type of UTF encoding, format, and length of data strings. The size of the data lake or data warehouse may be limited, so it may not be practical to store data from a particular data source in multiple data or file formats. In various embodiments, organize slices, and harness slice may be configured to accept different types of input data formats. For example, the organize slice in the above-referenced example may accept input data in the multiple date formats and multiple file formats. This configuration may allow the SCOP system to build a data infrastructure stack, which includes collect, organize, and harness slices, without requiring custom code to create a passage from the collect slices to the harness slices.

The stack generation engine 1410 may function to generate the data infrastructure stack. In some embodiments, a data infrastructure stack may include a set of one or more collect slices, one or more organize slices 1422, and one or more harness slices 1424. The stack generation engine 1410 may generate the data infrastructure stack in response to a completed selection of slices. In some embodiments, a data infrastructure stack may refer to a particular set of slices, and a data infrastructure stack instance (or, "deployment") may refer to a particular deployed data infrastructure stack and associated data.

In some embodiments, some or all of the functionality of the stack generation engine 1410 may be performed by one or more other systems (e.g., the first third-party system 808 or the second third-party system 810). For example, the slice management system 1402 may provide selected slices to the first third-party system 808 or the second third-party system 810, and the first third-party system 808 or the second third-party system 810 may generate the data infrastructure stack from the selected slices (e.g., within a customer's AWS account).

Figure 17:
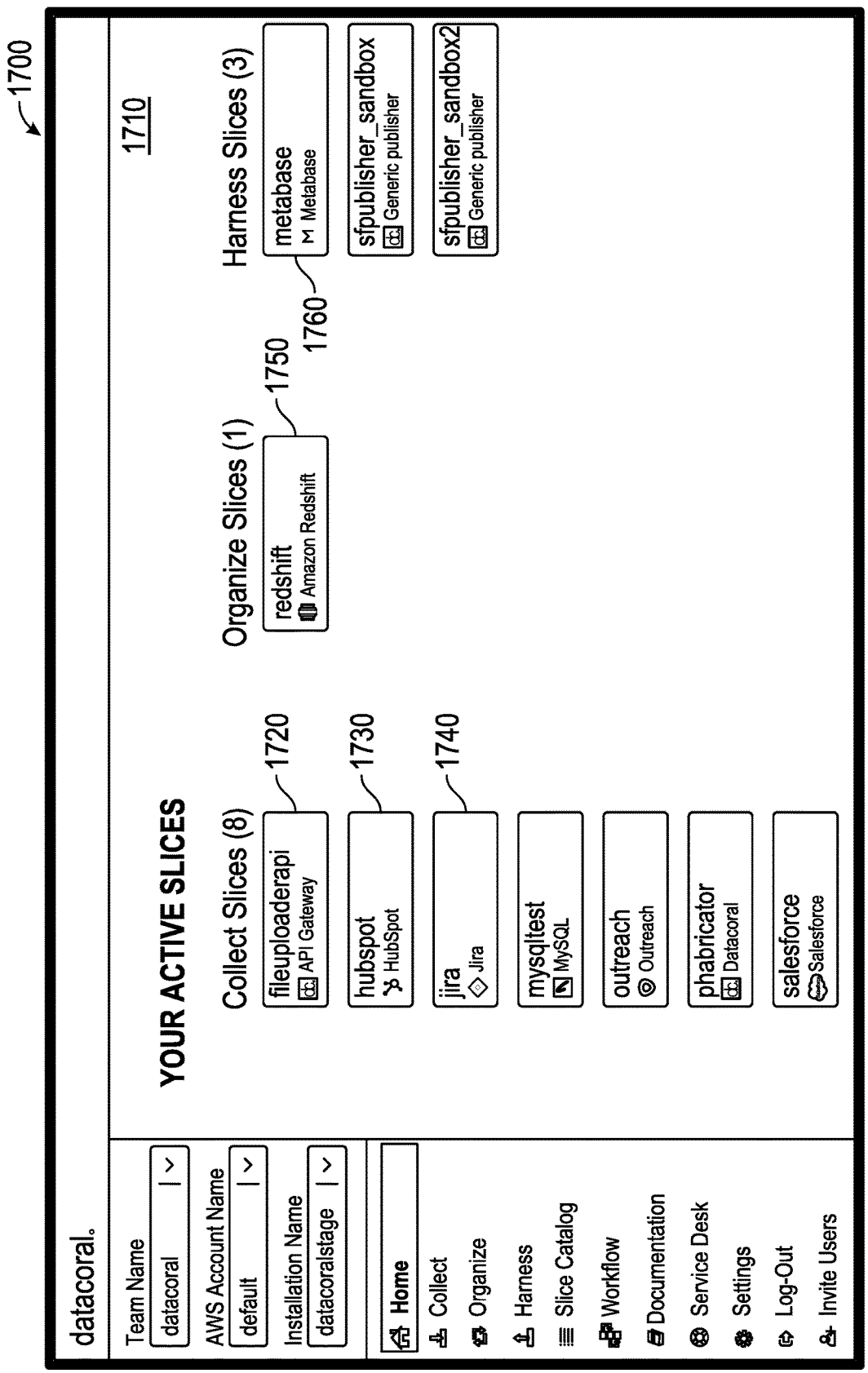
FIG. 17 depicts an example user interface of the SCOP system according to some embodiments.

The interface engine 1412 may function to receive input, present information, and output information. For example, the deployment interface engine 1412 may receive input for generating slices (e.g., slice definitions), receive input for selecting slices (e.g., specification requirements, slice descriptions, and/or slice identifiers), present a user interface (e.g., a GUI) for receiving input and presenting information (e.g., a graphical user interface for generating, selecting, and/or otherwise providing information regarding the slices), and provide data infrastructure stacks (e.g., to the first third-party system 808 or the second third-party system 810). In some embodiments, the interface engine outputs a user interface such as example user interface 1700 of FIG. 17. For example, section 1710 of the example user interface 1700 outputs multiple icons each representing one of multiple collect slices, organize slices, and harness slices, such as collect slices 1720, 1730, and 1740, an organize slice 1750, and a harness slice 1760 selected by the user.

In some embodiments, one or more of the collect slices 1720, 1730, and 1740, the organize slice 1750, and the harness slice 1760 may be chosen by the slice selection engine 1408. The collect slice 1720 may be utilized to collect data from an application program interface (API) Gateway. The collect slice 1730 may be utilized to collect data from Hubspot, a marketing and sales software that helps companies attract visitors. The organize slice 1750 may be utilized to analyze data using Redshift. The harness slice 1760 may be utilized to publish data onto Metabase, an open-source BI tool.

Figure 22:
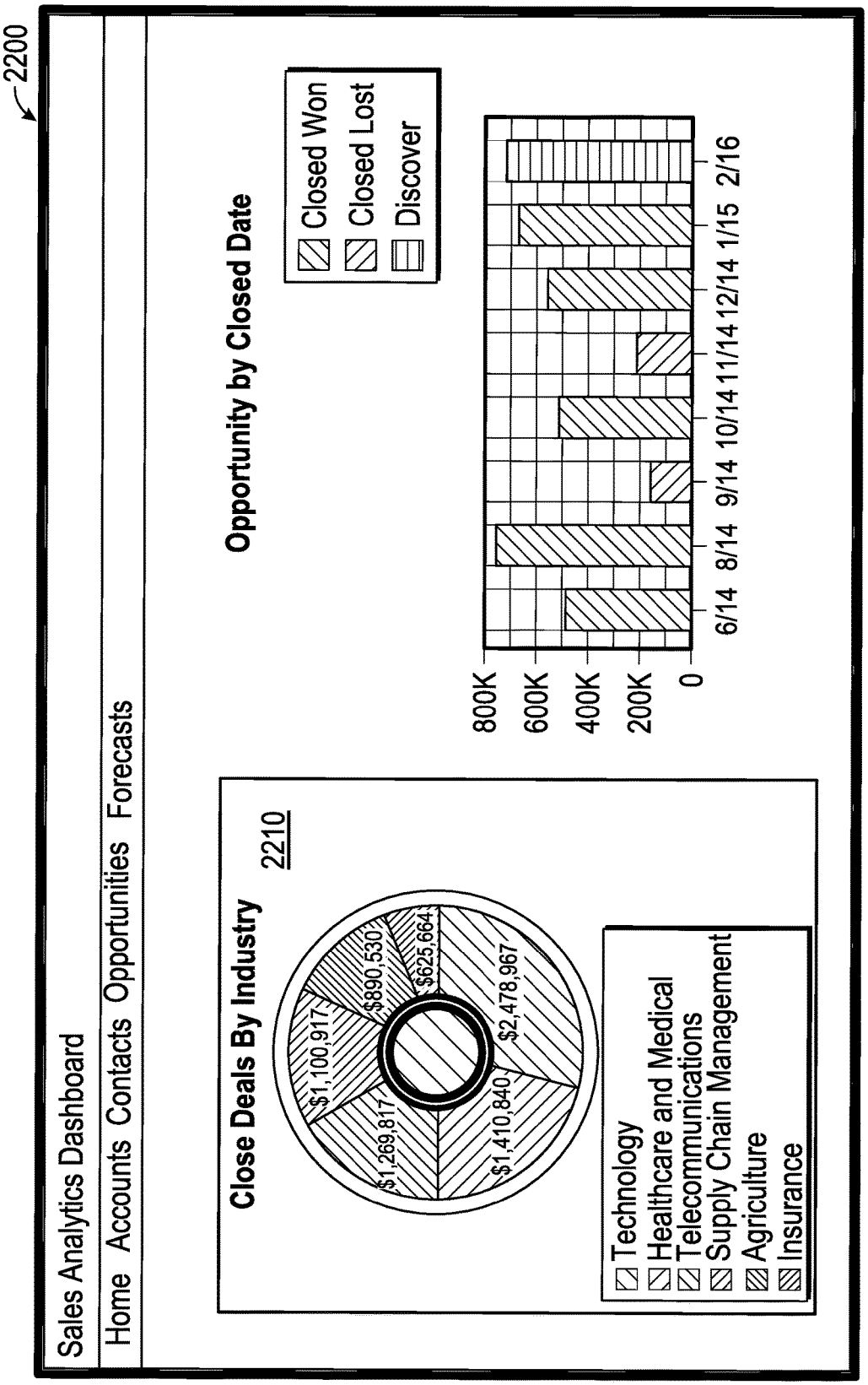
FIG. 22 depicts an example user interface according to some embodiments.

In various embodiments, the interface engine 1412 functions to output data analyzed by the organize slice in the form of a pie chart, bar graph, line graph, table, or the like. As seen in FIG. 22, the interface engine 1412 may output a result of analysis in the form of a pie chart 2210, illustrating the portion of the revenue received from different industries.

Figure 18:
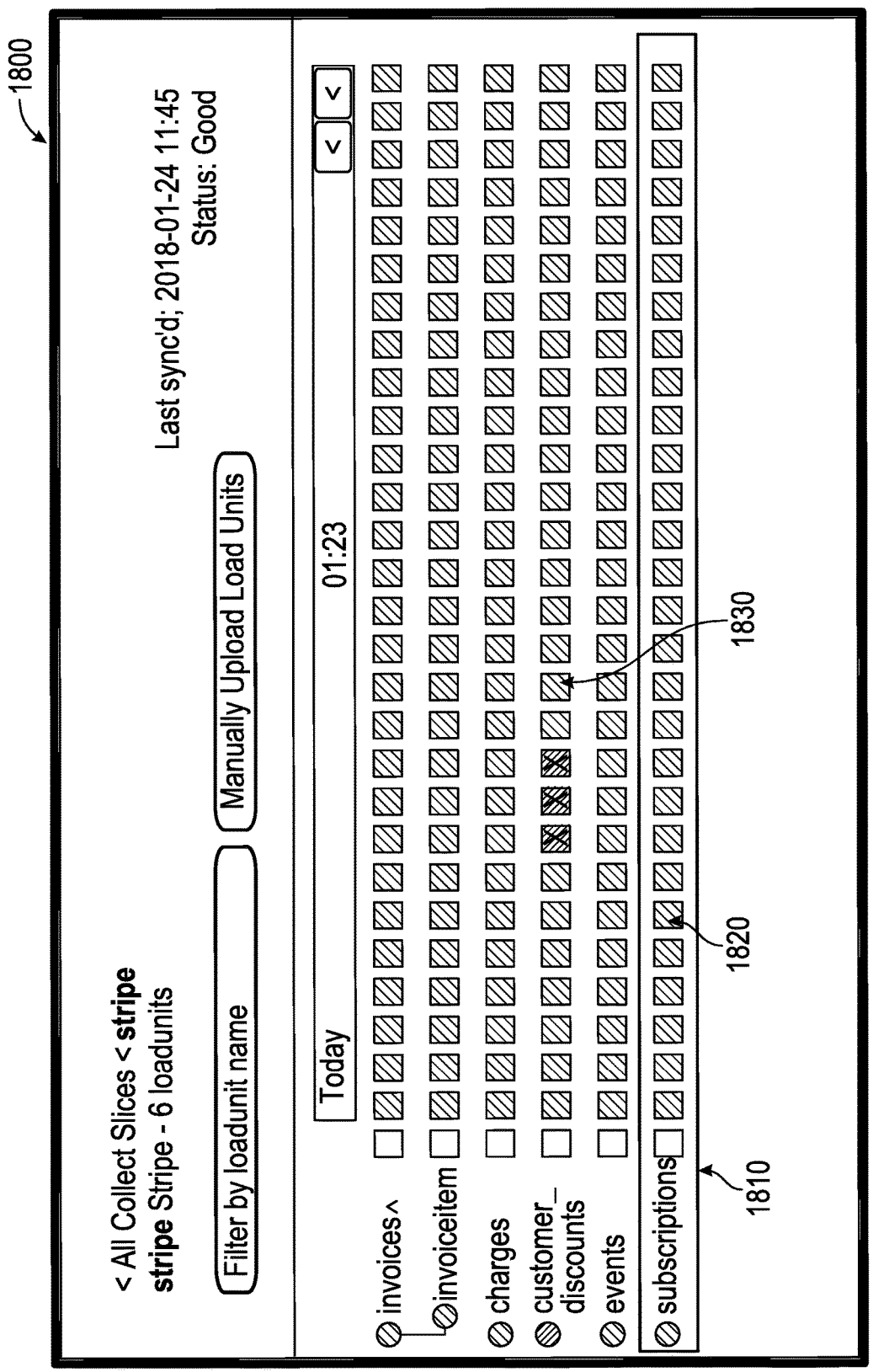
FIG. 18 depicts an example output of the status of collect slices from a particular data source according to some embodiments.

In one embodiment, the interface engine 1412 functions to output the status of collect slices from a particular data source. An example of this can be seen in FIG. 18. For example, each row of an example collect slice status output 1800 represents the collect slice status for one schema of the particular data source. Display area 1810 represents the collect slice status for the subscription schema of the particular data source over a period of time. Each square, such as a square 1820, represents an instance of the collect slice's attempt to access one schema of the particular data source. A square 1830 represents another instance of the collect slice's attempt to collect data from a "customer_discounts" schema of the particular data source which has failed. A user may interact with the square 1820 or 1830 to receive additional data regarding a particular collect slice status such as a duration of the collection function, or the amount of time required to collect data, and start time and end time for the data collection. In some embodiments, the additional data includes the amount of data collected during that collection instance.

Figure 19:
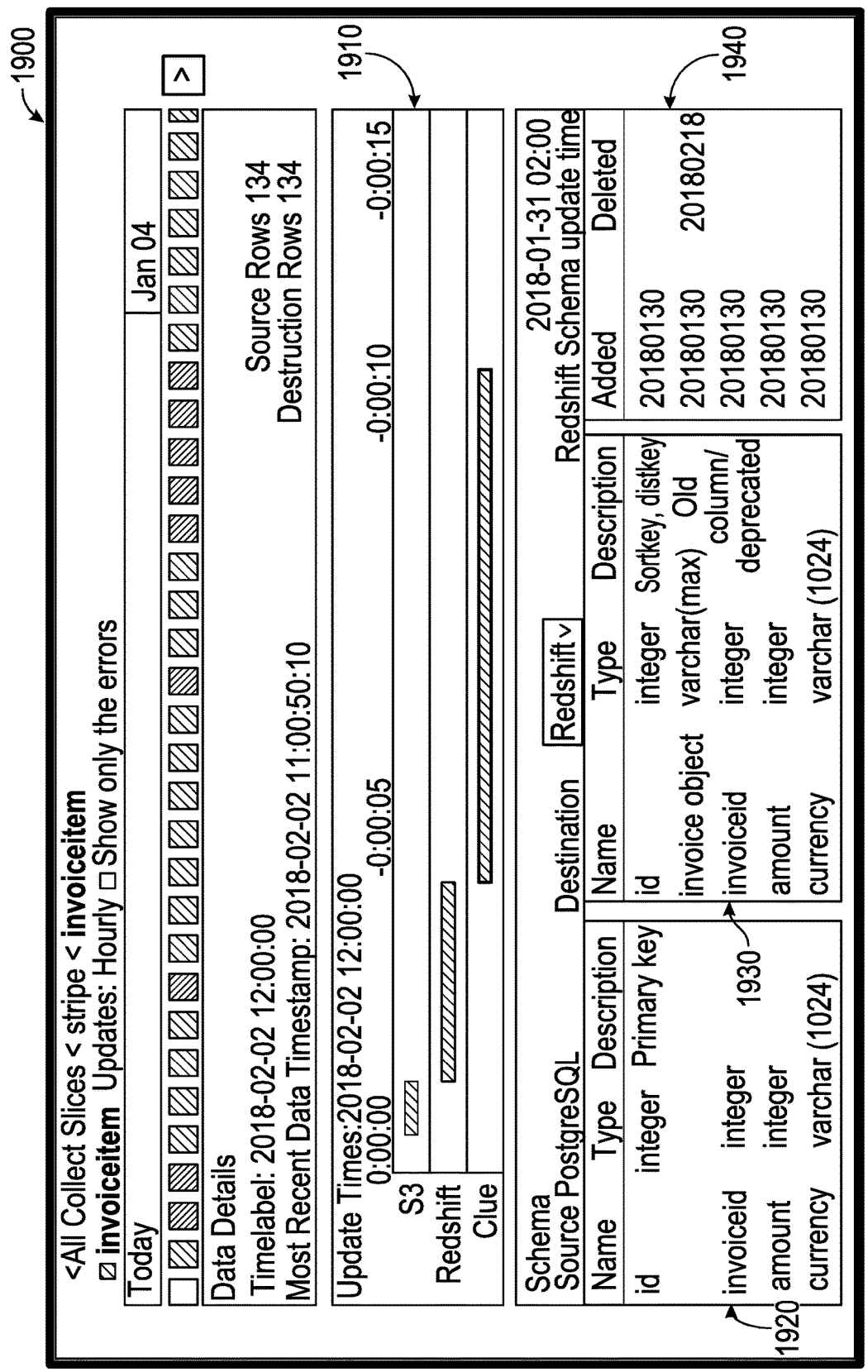
FIG. 19 depicts an example output user interface which displays the status of a particular table over time according to some embodiments.

In some embodiments, the interface engine 1412 functions to output the status of a particular table over time, such as an example output interface 1900 of FIG. 19. The example output interface 1900 outputs the status of a particular table over time; it allows a user to see how up-to-date the data in the table is. The data output in any given table may be a combination of raw data from one or more data sources and raw data that has been analyzed by one or more software applications accessed by one or more organize slices. The example output interface 1900 includes an area 1910 which depicts a representation of the time frame when the raw data which resulted in the particular table was collected and analyzed. Furthermore, the example output interface 1900 includes an area 1920 which contains information regarding the name, the type and description of data collected from the data source, PostgreSQL. An area 1930 of the example output interface 1900 contains information regarding the name, type, and description of the data analyzed by the analysis software, Redshift. An area 1940 of the example output interface 1900 contains information regarding date stamps of the analysis schema, specifically, a date stamp of when the schema was last added or deleted.

In some embodiments, the interface engine 1412 sends outputs an example user interface, such as the user interface 1600 of FIG. 16, to receive input, analysis, and output parameters from the user of the DCOS system 204. The user may generate a SQL call by interacting with a user interface and inputting a frequency of the SQL call in field 1612, a destination for the collected data in field 1614, and specifying a first data source in field 1616.

In some embodiments, the interface engine 1412 functions to facilitate the management of deployed data infrastructure stacks. For example, the interface engine 1412 may allow an administrator to manage a data infrastructure stack using client entity encryption keys based on one or more cross-account rules. For example, the cross-account rules may define access permissions set by the client entity, thereby ensuring control of the deployed data infrastructure stack remains with the client entity.

The communication engine 1414 may function to send requests, transmit and, receive communications, and/or otherwise provide communication with one or a plurality of systems. In some embodiments, the communication engine 1414 functions to encrypt and decrypt communications. The communication engine 1414 may function to send requests to and receive data from a system (e.g., the data source system 806, the first third-party system 808, and the second third-party system 810) through a network or a portion of a network. Depending upon implementation-specific considerations, the communication engine 1414 may send requests and receive data through a connection, all or a portion of which may be a wireless connection. The communication engine 1414 may request and receive messages, and/or other communications from associated systems. Communications may be stored in the data infrastructure slice management system datastore 1416.

In some embodiments, the SCOP engine 1418 may create a data status entry each time each slice of the slice datastore 1404 is requested to collect, organize, or harness data. The data status entry associated with a collect slice of the collect library 1420 may include information such as a time stamp linked to a time that the collect slice collects data, a type of data source that the collect slice is receiving data from, and properties of the data collected. In various embodiments, the data status entry includes some or all of the properties of the collect slice such as collect slice ID number, function, input parameters, computing resources required, and description of the collect slice. The data status entry associated with an organize slice of the organize library 1422 may include some or all of the properties of the organize slice such as organize slice ID number, function, format, computing resource, and description of the organize slice. The data status entry associated with an organize slice of the organize library 1422 may include information such as a time stamped linked to a time that the organize slice organizes or transforms data. The data status entry associated with a harness slice of the harness library 1424 may include some or all of the properties of the harness slice as such harness slice ID number, function, resource, format, and description of the harness slice. The data status entry associated with a harness slice of the harness library 1424 may include information such as a time stamped linked to a time that the harness slice publishes data.

Figure 20:
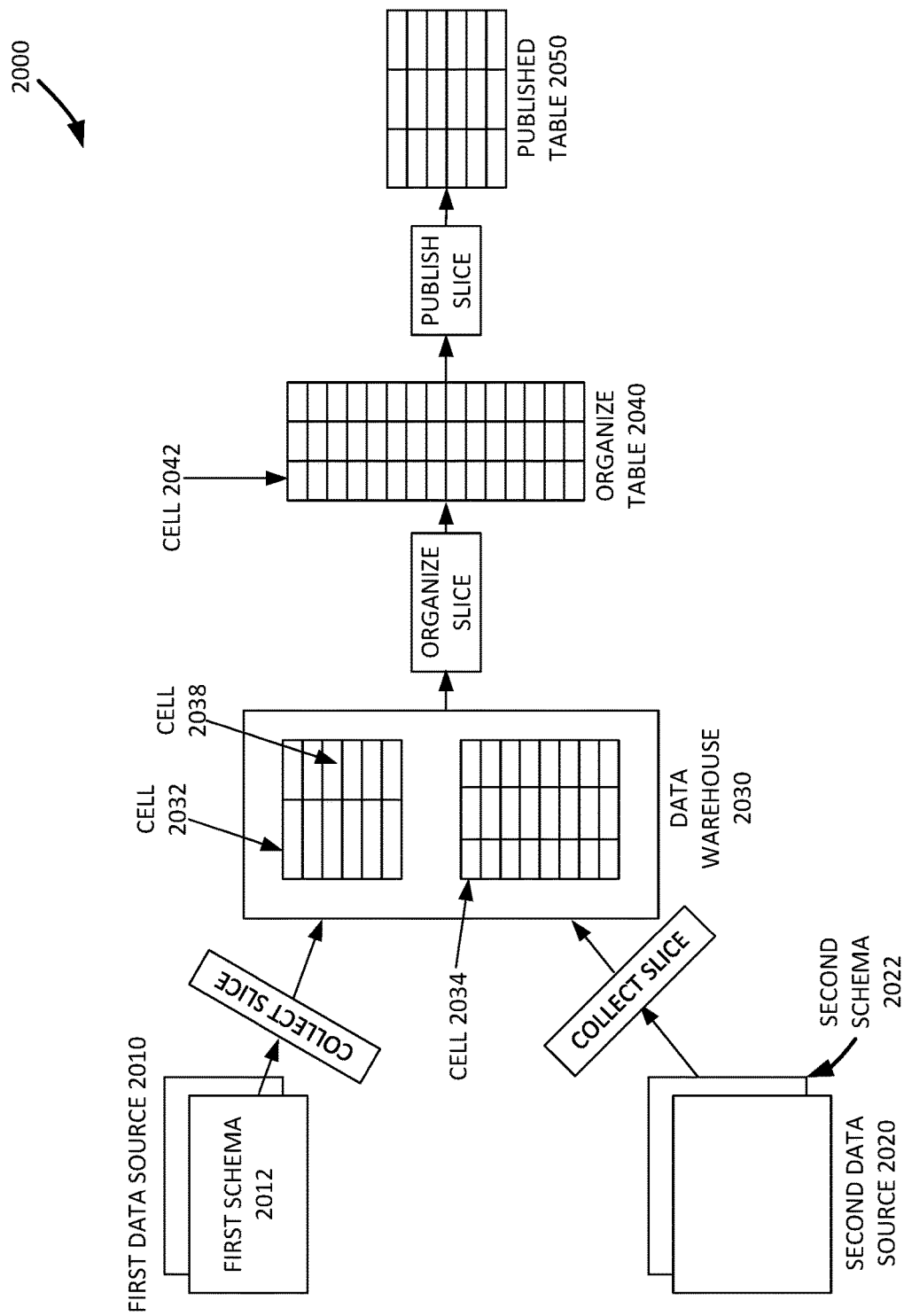
FIG. 20 depicts a graphical representation of collect, organize, and harness slices operating on multiple data sources according to some embodiments.

In various embodiments, the SCOP engine 1418 may create a data status entry for each data entry collected by the DCOS system 204. For example, a collect slice may collect data from a schema 2012 of a first data source 2010, as seen in FIG. 20. The collect slice may store the schema 2012, or a copy of the schema 2012 into a data warehouse 2030. The SCOP engine 1418 may create a data status entry for each cell of the schema 2012, such as cell 2032. Each time the collect slice collect data from the schema 2012, the SCOP engine 1418 may update the data status entry for the cell 2032. This information may be utilized to determine the how up-to-date data stored in a cell of the data warehouse is. Another collect slice may collect data from a second schema 2022 of a second data source 2020. The collect slice may store the schema 2022, or a copy of the schema 2022 into the data warehouse 2030. The SCOP engine 1418 may create another data status entry for each cell of the schema 2022, such as a cell 2034.

Each time the data in cell 2032 or 2034 is accessed, by a collect slice, an organize slice, or a harness slice, the data status entry associated with the cell may be updated with information regarding functions performed on the cell. For example, an organize slice may take one column of cells from the schema 2012 and another column from the schema 2022, perform a sum of a first row from the schema 2012 and a first row of the schema 2022, and store the sum in a cell 2042 of an organize table 2040. Once the collect slice has organized or transformed the data from the two collected cells and stored the result of the organization or transformation in another table. In various embodiments, the SCOP engine 1418 may create a data status entry for the cell 2042 of the organize table 2040. The data status entry for the cell 2042 may include a pointer to the one or more cells of the data warehouse 2030 that the cell 2042 originates. For example, the organize table 2040 may be stored in the data warehouse 2030. In some embodiments, the organize table 2040 may be stored in a datastore of the first third-party system 808.

In some embodiments, the SCOP engine 1418 may update the data status entry for cells 2032 and 2034 to reflect that the cells 2032 and 2034 are added together, and that the cell 2042 depends on the cells 2032 and 2034. Further manipulation or transformation of one of the cells 2032, 2034, or 2042 may result in the updating of the data status entry for the cells 2032, 2034, or 2042. In another example, the transformation performed on the data may include determining the minimum value of cell 2032 and 2034. The minimum value of the cell 2032 and 2034 may be saved into the cell 2042 of the organize table 2040. In one embodiment, the SCOP engine 1418 creates a data status entry for the cell 2042. In various embodiments, the minimum value of the cell 2032 and 2034 may overwrite one of the cells 2032 and 2034, in which case, the data status entry for the overwritten cell may be updated to reflect that the value of the overwritten cell was updated at a particular time.

A harness slice may receive as an input, the organize table 2040 and output a published table 2050. A harness slice may take a column of data of the organize table 2040, which includes the cell 2042, determine an average of the value in that column and output that into the published table 2050 in a cell 2052. In various embodiments, the published table 2050 may be stored in the data warehouse 2030. In some embodiments, the published table 2050 may be stored in a datastore of the first third-party system 808. The data status entry for the cell 2052 may state that the cell 2052 is an average of N number of cells of a column of the organize table 2040 and that each cell of the column of the organize table 2040. In some examples, the data status entry for the cell 2052 may include a pointer to the one or more cells of the data warehouse 2030 that the cell 2052 originates. The SCOP engine 1418 may utilize the data status entries to determine the status of a particular table over time, such as the example output interface 1900 of FIG. 19. In some embodiments, the DCOS system 204 may include one harness slice for each of the different harness tools supported by the DCOS system 204. The data status entry may be stored in the data infrastructure slice management system datastore 1416. In various embodiments, the data status entry is stored in the datastore of the third-party system such as the first third-party system 808.

The data status entry may be utilized to determine the "freshness" or how up-to-date a particular piece of data is. The DCOS system 204 may utilize information from the data status entry to output an interface such as an example output interface 2100, which displays the dependency graph of a particular table, "engagement.mv_customer_churn_probability." The example output interface 2100 is capable of displaying different iterations of the particular table. The user may interact with area 2102 of the example output interface 2100 to view one particular iteration. Area 2110 gives a timestamp for the particular iteration of the particular table. Area 2120 displays a downstream dependency for the particular table, or in other words, the tables which were used to determine the particular table. Furthermore, the area 2120 displays a time range of when each of the intervening tables were generated. For example, as seen in area 2120, the "engagement.mv_customer_churn_probability" table depends on another table "Zendesk_ticket_metrics."

The SCOP engine 1418 may function to create a passage to ensure that data flows downstream from an originating software tool which may collect data from multiple sources to a publication software tool which serves up data into an application, database, or machine learning algorithm. In some embodiments, the SCOP engine 1418 monitors the data as it flows downstream to allow a user of the DCOS system 204 to backtrack and determine the source of a published data.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system, comprising:
a memory storing computer executable components; and
a processor configured to execute instructions stored in the memory to perform a method, the method comprising:
receiving, from a first enterprise system, a series of first language commands written in a first language to control a first data flow of first data, the first data being from a first and a second data source, the series of first language commands indicating first functions to be performed including collection of the first data, storage of the first data into a first data warehouse, and application of one or more first applications on the stored first data, the first and second data sources being unrelated to each other and being remote from the first enterprise system and the first data warehouse;
translating the series of first language commands into first translated commands that may be provided to the first and second data sources as well as the first data warehouse to control the first data flow, the first translated commands being based on the series of first language commands in the first language, a structure of the first translated commands being retrieved from a translator data structure based on the first translated commands, the first and second data sources requiring different translated commands and the first data warehouse requiring different translated commands form the first and second data sources;
providing a first set of the first translated commands to the first data source to collect the first data from the first data source;
providing a second set of the first translated commands to the second data source to collect the first data from the second data source;
providing a third set of the first translated commands to transform the first data in the first data warehouse;
receiving, from a second enterprise system, a series of second language commands written in the first language to control a second data flow of second data, the second data being from the second data source and a third data source, the series of second language commands indicating second functions to be performed including collection of the second data, storage of the second data into a second data warehouse, and application of one or more second applications on the stored second data;
translating the series of second language commands into second translated commands that may be provided to the second and third data sources as well as the second data warehouse to control the second data flow, the second translated commands being based on the series of second language commands in the first language, a structure of the second translated commands being retrieved from the translator data structure based on the first translated commands, the second and third data sources requiring different translated commands and the second data warehouse requiring different translated commands form the second and third data sources;
providing a first set of the second translated commands to the second data source to collect the second data from the second data source;
providing a second set of the second translated commands to the third data source to collect the second data from the third data source; and
providing a third set of the second translated commands to transform the second data in the second data warehouse.

2. The system of claim 1, wherein the first language is an SQL language.

3. The system of claim 1, the method further comprising receiving an API update from the second data source and generating the structure of the first translated commands and the structure of the second translated commands including the upddated API.

4. The system of claim 1, the method further comprising determining dependencies based on the series of first language commands, synchronizing queries for the first and second set of first translated commands, orchestrating data flow from the first and second data sources, and orchestrating functions of the first data warehouse.

5. The system of claim 1, wherein the series of first language commands further comprises instructions to publish the first data from the first data warehouse to a first application.

6. The system of claim 5, the method further comprising providing a fourth set of the first translated commands to the first data warehouse to publish the first data to the first application.

7. The system of claim 1, wherein the first data from the first data source is placed in regular tables in the first data warehouse based on the first translated commands, the regular tables supporting replace, merge, and append semantics.

8. The system of claim 7, wherein at least some of the first data from the second data source is placed in partitioned tables, the partitioned tables supporting append semantics and supporting periodic pruning of rows based on retention rules.

9. The system of claim 1, the method further comprising generating a time label for a data batch of the first data from the first data source, the time label being based on a system clock marking when the data batch was collected.

10. A method being implemented by a computing system including one or more physical processors and storage media storing machine-readable instructions, the method comprising:

receiving, from a first enterprise system, a series of first language commands written in a first language to control a first data flow of first data, the first data being from a first and a second data source, the series of first language commands indicating first functions to be performed including collection of the first data, storage of the first data into a first data warehouse, and application of one or more first applications on the stored first data, the first and second data sources being unrelated to each other and being remote from the first enterprise system and the first data warehouse;

translating the series of first language commands into first translated commands that may be provided to the first and second data sources as well as the first data warehouse to control the first data flow, the first translated commands being based on the series of first language commands in the first language, a structure of the first translated commands being retrieved from a translator data structure based on the first translated commands, the first and second data sources requiring different translated commands and the first data warehouse requiring different translated commands form the first and second data sources;

providing a first set of the first translated commands to the first data source to collect the first data from the first data source;

providing a second set of the first translated commands to the second data source to collect the first data from the second data source;

providing a third set of the first translated commands to transform the first data in the first data warehouse;

receiving, from a second enterprise system, a series of second language commands written in the first language to control a second data flow of second data, the second data being from the second data source and a third data source, the series of second language commands indicating second functions to be performed including collection of the second data, storage of the second data into a second data warehouse, and application of one or more second applications on the stored second data;

translating the series of second language commands into second translated commands that may be provided to the second and third data sources as well as the second data warehouse to control the second data flow, the second translated commands being based on the series of second language commands in the first language, a structure of the second translated commands being retrieved from the translator data structure based on the first translated commands, the second and third data sources requiring different translated commands and the second data warehouse requiring different translated commands form the second and third data sources;

providing a first set of the second translated commands to the second data source to collect the second data from the second data source;

providing a second set of the second translated commands to the third data source to collect the second data from the third data source; and providing a third set of the second translated commands to transform the second data in the second data warehouse.

11. The method of claim 10, wherein the first language is an SQL language.

12. The method of claim 10, the method further comprising receiving an API update from the second data source and generating the structure of the first translated commands and the structure of the second translated commands including the updated API.

13. The method of claim 10, the method further comprising determining dependencies based on the series of first language commands, synchronizing queries for the first and second set of first translated commands, orchestrating data flow from the first and second data sources, and orchestrating functions of the first data warehouse.

14. The method of claim 10, wherein the series of first language commands further comprises instructions to publish the first data from the first data warehouse to a first application.

15. The method of claim 14, the method further comprising providing a fourth set of the first translated commands to the first data warehouse to publish the first data to the first application.

16. The method of claim 10, wherein the first data from the first data source is placed in regular tables in the first data warehouse based on the first translated commands, the regular tables supporting replace, merge, and append semantics.

17. The method of claim 16, wherein at least some of the first data from the second data source is placed in partitioned tables, the partitioned tables supporting append semantics and supporting periodic pruning of rows based on retention rules.

18. The method of claim 10, the method further comprising generating a time label for a data batch of the first data from the first data source, the time label being based on a system clock marking when the data batch was collected.

* * * * *